United States Patent
Adachi et al.

(10) Patent No.: US 9,286,091 B2
(45) Date of Patent: Mar. 15, 2016

(54) SEMICONDUCTOR DEVICE IMPROVING PERFORMANCE OF VIRTUAL MACHINES

(71) Applicant: Renesas Electronics Corporation, Kawasaki-shi, Kanagawa (JP)

(72) Inventors: Koji Adachi, Kanagawa (JP); Hitoshi Suzuki, Kanagawa (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 179 days.

(21) Appl. No.: 13/794,510

(22) Filed: Mar. 11, 2013

(65) Prior Publication Data

US 2013/0263129 A1   Oct. 3, 2013

(30) Foreign Application Priority Data

Mar. 30, 2012 (JP) ................. 2012-082324

(51) Int. Cl.
*G06F 9/455* (2006.01)
*G06F 9/30* (2006.01)
*G06F 9/38* (2006.01)

(52) U.S. Cl.
CPC ........ *G06F 9/45533* (2013.01); *G06F 9/30076* (2013.01); *G06F 9/3851* (2013.01)

(58) Field of Classification Search
None
See application file for complete search history.

(56) References Cited

U.S. PATENT DOCUMENTS

| 8,510,756 B1* | 8/2013 | Koryakin | G06F 9/45558 718/1 |
| 2005/0080965 A1* | 4/2005 | Bennett | G06F 9/4812 710/200 |
| 2007/0028238 A1* | 2/2007 | Bennett | G06F 9/45558 718/1 |
| 2009/0249349 A1* | 10/2009 | Bose et al. | 718/103 |
| 2011/0047544 A1 | 2/2011 | Yehuda et al. | |
| 2011/0093750 A1* | 4/2011 | Williams | G06F 9/5077 714/47.2 |
| 2011/0197190 A1 | 8/2011 | Hattori et al. | |

FOREIGN PATENT DOCUMENTS

JP    2005-56017 A    3/2005

OTHER PUBLICATIONS

Taro et al., Information Processor, Mar. 3, 2005, JP #2005-056017, 14 pages (English translated).*
Dasoman et al., Stub (distributed computing) and Method stub, Sep. 22, 2011 and Apr. 14, 2011, Wikipedia, 4 pages.*
European Search Report dated Jul. 7, 2015.

* cited by examiner

*Primary Examiner* — Emerson Puente
*Assistant Examiner* — Zhi Chen
(74) *Attorney, Agent, or Firm* — McGinn IP Law Group, PLLC.

(57) ABSTRACT

A semiconductor device includes an instruction decoder that decodes an instruction code and thereby generates instruction information, an execution unit that performs an operation based on the instruction information through pipeline processing, and a pipeline control unit that controls an order of the instruction code to be processed in the pipeline processing, in which the pipeline control unit includes a register for defining presence/absence of an authority to execute a first privilege program for each virtual machine, the first privilege program being to be executed on one virtual machine, refers to the register, and when the virtual machine that has issued the instruction code relating to the first privilege program has an authority to execute the first privilege program, instructs the execution unit to execute a process based on the instruction code relating to a second privilege program, based on an operation of the first privilege program.

12 Claims, 19 Drawing Sheets

VIRTUAL MACHINE CONTROL REGISTER (VM0)

| ENABLE FLAG EN | HV PRIVILEGE FLAG HVP | HVTRAP PERMISSION FLAG HVTE | HVCALL PERMISSION FLAG HVCE |
|---|---|---|---|
| 1 (ENABLED) | 0 (DISABLED) | 0 (PROHIBITED) | 1 (PERMITTED) |

VIRTUAL MACHINE CONTROL REGISTER (VM1)

| ENABLE FLAG EN | HV PRIVILEGE FLAG HVP | HVTRAP PERMISSION FLAG HVTE | HVCALL PERMISSION FLAG HVCE |
|---|---|---|---|
| 1 (ENABLED) | 0 (DISABLED) | 1 (PERMITTED) | 1 (PERMITTED) |

VIRTUAL MACHINE CONTROL REGISTER (VM2)

| ENABLE FLAG EN | HV PRIVILEGE FLAG HVP | HVTRAP PERMISSION FLAG HVTE | HVCALL PERMISSION FLAG HVCE |
|---|---|---|---|
| 1 (ENABLED) | 0 (DISABLED) | 0 (PROHIBITED) | 0 (PROHIBITED) |

Fig. 4

MCTL

| 31 | 30 | 29 | | | | | | 22 | 21 | | | | | 16 | 15 | | | | | | | 2 | 1 | 0 |
|---|---|---|---|---|---|---|---|---|---|---|---|---|---|---|---|---|---|---|---|---|---|---|---|---|
| EN | MT | 0 | 0 | 0 | 0 | 0 | 0 | 0 | | | STID | | | | 0 | 0 | 0 | 0 | 0 | 0 | 0 | 0 | MA | UIC |

| BIT | NAME | MEANING | R/W | | | INITIAL VALUE | |
|---|---|---|---|---|---|---|---|
| | | | WITH HV PRIVILEGE | | NONE | | |
| | | | NC | VC | VC | NC | VC |
| 31 | EN | ENABLE BIT FOR VIRTUAL MACHINE. FOR VIRTUAL MACHINE, ENABLING SETTING OF VIRTUAL MACHINE CAN BE MADE BY WRITING INTO THIS REGISTER. | R | R/W | R | 1 | 0 |
| 30 | MT | MULTI-THREAD OPERATION BIT. WHEN THIS BIT IS 0, IT BECOMES SINGLE-THREAD OPERATION. IT IS RECOMMENDED THAT THIS REGISTER BE ACCESSED BY EST/DST INSTRUCTION. | R/W | | | 0 | |
| 29-22 | — | RESERVED AREA | R | | | 0 | |
| 21-16 | STID | HARDWARE THREAD ID TO BE OPERATED IN SINGLE-THREAD OPERATION STATE. VALUES OF MCFG1 AND BTID ARE SET WHEN VIRTUAL MACHINE RESTART EXCEPTION IS ACCEPTED. | R/W | | | 0 | UNDEFINED |
| 15-2 | — | RESERVED AREA | R | | | 0 | |
| 1 | MA | BIT FOR CONTROLLING MISALIGN-ACCESS. 0: AT THE TIME OF MISALIGN-ACCESS, EXCEPTION OCCURS 1: APPROPRIATE OPERATION IS PERFORMED BY HARDWARE | R/W | | | 0 | |
| 0 | UIC | BIT FOR CONTROLLING INTERRUPT PERMISSION PROHIBITION OPERATION IN USER MODE. WHEN THIS BIT IS SET, EI/DI INSTRUCTION CAN BE EXECUTED IN USER MODE. | R/W | | | 0 | |

Fig. 5

MCFG0

| 31 | | | | | | | | | | | | | 18 | 17 | 16 | 15 | | | | | | | | | | | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | STID | 0 | 0 | 0 | 0 | 0 | 0 | 0 | 0 | 0 | 0 | 0 | MM | HVP | HVCE | HVTE |

| BIT | NAME | MEANING | R/W WITH HV PRIVILEGE | R/W NONE | INITIAL VALUE |
|---|---|---|---|---|---|
| 31-18 | - | RESERVED AREA | NC VC | NC VC | 0 |
| 17,16 | SPID | INDICATING SYSTEM PROTECTION NUMBER. | R | R | UN-DEFINED ※ |
| 15-4 | - | RESERVED AREA | R | R | 0 |
| 3. | MM | BIT FOR ENABLING ADDRESS CONVERSION BY MMU. WHEN MMU FUNCTION IS NOT INSTALLED, 0 IS READ AS READ VALUE. WRITING IS IGNORED. | R/W | R | UN-DEFINED ※ |
| 2 | HVP | BIT INDICATING THAT HV PRIVILEGE IS GIVEN TO VIRTUAL MACHINE. THIS BIT IS USED WHEN HV PRIVILEGE IS GIVEN TO VIRTUAL MACHINE. | R/W | R | 1 |
| 1 | HVCE | BIT FOR CONTROLLING WHETHER OR NOT EXECUTION OF HVCALL INSTRUCTION IS PERMITTED TO VIRTUAL MACHINE. 1 IS ALWAYS READ IN NATIVE MODE. | R/W | R | 1 |
| 0 | HVTE | BIT FOR CONTROLLING WHETHER OR NOT EXECUTION OF HVTRAP INSTRUCTION IS PERMITTED TO VIRTUAL MACHINE. 1 IS ALWAYS READ IN NATIVE MODE. | R/W | R | 1 |

Fig. 6

| VIRTUAL MACHINE CONTROL REGISTER (VM0) | | | |
|---|---|---|---|
| ENABLE FLAG EN | HV PRIVILEGE FLAG HVP | HVTRAP PERMISSION FLAG HVTE | HVCALL PERMISSION FLAG HVCE |
| 1 (ENABLED) | 0 (DISABLED) | 0 (PROHIBITED) | 1 (PERMITTED) |

| VIRTUAL MACHINE CONTROL REGISTER (VM1) | | | |
|---|---|---|---|
| ENABLE FLAG EN | HV PRIVILEGE FLAG HVP | HVTRAP PERMISSION FLAG HVTE | HVCALL PERMISSION FLAG HVCE |
| 1 (ENABLED) | 1 (ENABLED) | 1 (PERMITTED) | 1 (PERMITTED) |

| VIRTUAL MACHINE CONTROL REGISTER (VM2) | | | |
|---|---|---|---|
| ENABLE FLAG EN | HV PRIVILEGE FLAG HVP | HVTRAP PERMISSION FLAG HVTE | HVCALL PERMISSION FLAG HVCE |
| 1 (ENABLED) | 0 (DISABLED) | 0 (PROHIBITED) | 0 (PROHIBITED) |

SEMICONDUCTOR DEVICE IMPROVING PERFORMANCE OF VIRTUAL MACHINES

CROSS-REFERENCE TO RELATED APPLICATIONS

This application is based upon and claims the benefit of priority from Japanese patent application No. 2012-082324, filed on Mar. 30, 2012, the disclosure of which is incorporated herein in its entirety by reference.

BACKGROUND

The present invention relates to a semiconductor device. For example, the present invention relates to a semiconductor device capable of executing a plurality of programs in parallel through pipeline processing.

In recent years, in semiconductor devices, a number of multi-thread processors capable of executing a plurality of programs in a single processor have been proposed. The multi-thread processor like this includes a plurality of threads each of which generates an independent instruction flow. Meanwhile, there is a technique called "virtualization" that makes one hardware device look as if it is a plurality of hardware devices. This virtualization technique is realized by interposing a management software program called "VMM (Virtual Machine Monitor)" or "hypervisor" between the OS (Operating System) and the hardware (processor or IO). FIG. 20 shows a hierarchical structure of a system to which the virtualization technique is applied. As shown in FIG. 20, the system to which the virtualization technique is applied has such a configuration that a hypervisor program is interposed between the hardware and the OS. When a plurality of virtual machines that are logically defined are operated in a multi-thread processor, a thread is assigned to one of the plurality of virtual machines. Further, in the multi-thread processor, the parallel executions of virtual machines are realized by executing the virtual machines on hardware threads. FIG. 21 shows corresponding relation between virtual machines and threads. In the example shown in FIG. 21, two threads are assigned to each of virtual machines VM0 to Vm2.

Further, a privilege level is defined for a program(s) to be executed in the processor according to the importance of the resource to be accessed. Further, the quality of software is determined by a plurality of factors including development management, programming, and verification. Further, among the programs to be executed on the processor, a program(s) requiring a high reliability level is developed under strict management so that its operation can be grasped in detail. That is, the reliability level of a program is determined based on what kind of development process the program has been developed through. Further, for example, control is performed so that access to a resource that requires a high privilege level is permitted to a program having a high reliability level, but it is not permitted to a program having a low reliability level.

However, even in the processor like this, it is necessary to perform a process for a resource that requires a high privilege level for its access in response to a request from a user application or a guest OS for which a low privilege level is defined. In such a case, the processor starts a hypervisor program in response to a request from a user application or a guest OS and performs the required process through the hypervisor program. As a result, when access to a resource requiring a high privilege level for its access is requested from a user application or a guest OS, the process takes time for switching the program, and thereby causing a problem that the processing performance of the processor deteriorates.

Therefore, Japanese Unexamined Patent Application Publication No. 2005-56017 discloses a technique for reducing the time required for switching the program. In Japanese Unexamined Patent Application Publication No. 2005-56017, the processor has a privilege register for a guest OS. Then, when access to a resource requiring high reliability occurs, the process is completed without starting the hypervisor program as long as the request can be satisfied by the process for the guest OS alone. In this way, the technique disclosed in Japanese Unexamined Patent Application Publication No. 2005-56017 can reduce the frequency at which the hypervisor program is started.

SUMMARY

However, the present inventors have found the following problem. In a plurality of virtual machines running on a multi-thread processor, the plurality of these virtual machines can be operated in parallel. Therefore, when access by a hypervisor program for which a high privilege level is defined occurs, the operations of all the virtual machines have to be temporarily stopped. Therefore, there is a problem that when access that requires a process performed by a hypervisor program occurs frequently, interference between virtual machines occurs frequently and the operations of other virtual machines are thereby hampered. Note that the technique disclosed in Japanese Unexamined Patent Application Publication No. 2005-56017 relates to a processor that operates with a single thread, in which a plurality of virtual machines never operate in parallel. Therefore, this technique cannot solve the interference problem between virtual machines.

A first aspect of the present invention is a semiconductor device in which a plurality of virtual machines each of which issues an instruction code belonging to an instruction flow corresponding to a program are defined, the semiconductor device including: an instruction decoder that decodes the instruction code and thereby generates instruction information; an execution unit that performs an operation based on the instruction information through pipeline processing; and a pipeline control unit that controls an order of the instruction code to be processed in the pipeline processing, in which: the pipeline control unit includes a register for defining presence/absence of an authority to execute a first privilege program for each virtual machine, the first privilege program being to be executed on one virtual machine; and the pipeline control unit refers to the register, and when the virtual machine that has issued the instruction code relating to the first privilege program has an authority to execute the first privilege program, instructs the execution unit to execute a process based on the instruction code relating to a second privilege program, based on an operation of the first privilege program.

Another aspect of the present invention is a semiconductor device that performs processing while switching an operating mode between a virtual machine mode in which a program is performed in parallel by a plurality of virtual machines and a native mode in which a program is performed by exclusively using an execution time of an execution unit, in which the semiconductor device executes in the virtual machine mode: a user program having a user privilege level for which access to a specific hardware resource is limited among hardware resources within the semiconductor device; a supervisor program that manages the user program; and a hypervisor stub program having a hypervisor privilege level which runs in response to a call from the supervisor program and for which access to hardware resources including the specific hardware resource is permitted, presence/absence of an authority to execute a first instruction code for calling the hypervisor stub program is defined for the supervisor program, and the hypervisor stub program starts in response to a call from the supervisor program for which execution of the first instruction code is permitted, calls a hypervisor program by executing a second instruction code, and changes the operating mode to the native mode.

A semiconductor device according to an aspect of the present invention determines whether or not a program that has called a first privilege program that runs on one virtual machine has an authority to execute the first privilege program by referring to a register. Then, the semiconductor device executes a second privilege program only when the virtual machine has an authority to execute the first privilege program. As a result, the semiconductor device can prevent the second privilege program from being called frequently and thereby prevent the processing performance of other virtual machines from being deteriorated due to the interference between virtual machines.

A semiconductor device according to an aspect of the present invention can prevent the processing performance of other virtual machines from being deteriorated due to the operation of one virtual machine.

BRIEF DESCRIPTION OF THE DRAWINGS

The above and other aspects, advantages and features will be more apparent from the following description of certain embodiments taken in conjunction with the accompanying drawings, in which:

FIG. 4 is a schematic diagram of a group of virtual machine setting registers of a semiconductor device according to a first embodiment;

FIG. 5 is an example of a virtual machine setting register according to a first embodiment;

FIG. 6 is an example of a virtual machine setting register according to a first embodiment;

FIG. 19 is a schematic diagram of a group of virtual machine setting registers of a semiconductor device according to a second embodiment;

DETAILED DESCRIPTION

First Embodiment

Embodiments are explained hereinafter with reference to the drawings. Firstly, in a semiconductor device according to an embodiment, information processing is performed by a virtual machine. In general, a virtual machine is implemented as part of the software function. However, in a semiconductor device according to an embodiment, execution of a program performed by a virtual machine is implemented as one function of the hardware. A processor that executes a program by using a virtual machine that is implemented as one function of the hardware as described above is referred to as "hardware multi-thread processor". Further, embodiments shown below are explained by using a hardware multi-thread processor as an example of a semiconductor device. However, the embodiments are not limited to hardware multi-thread processors. That is, they can be applied to any processor capable of executing a plurality of threads in parallel.

Figure 1:
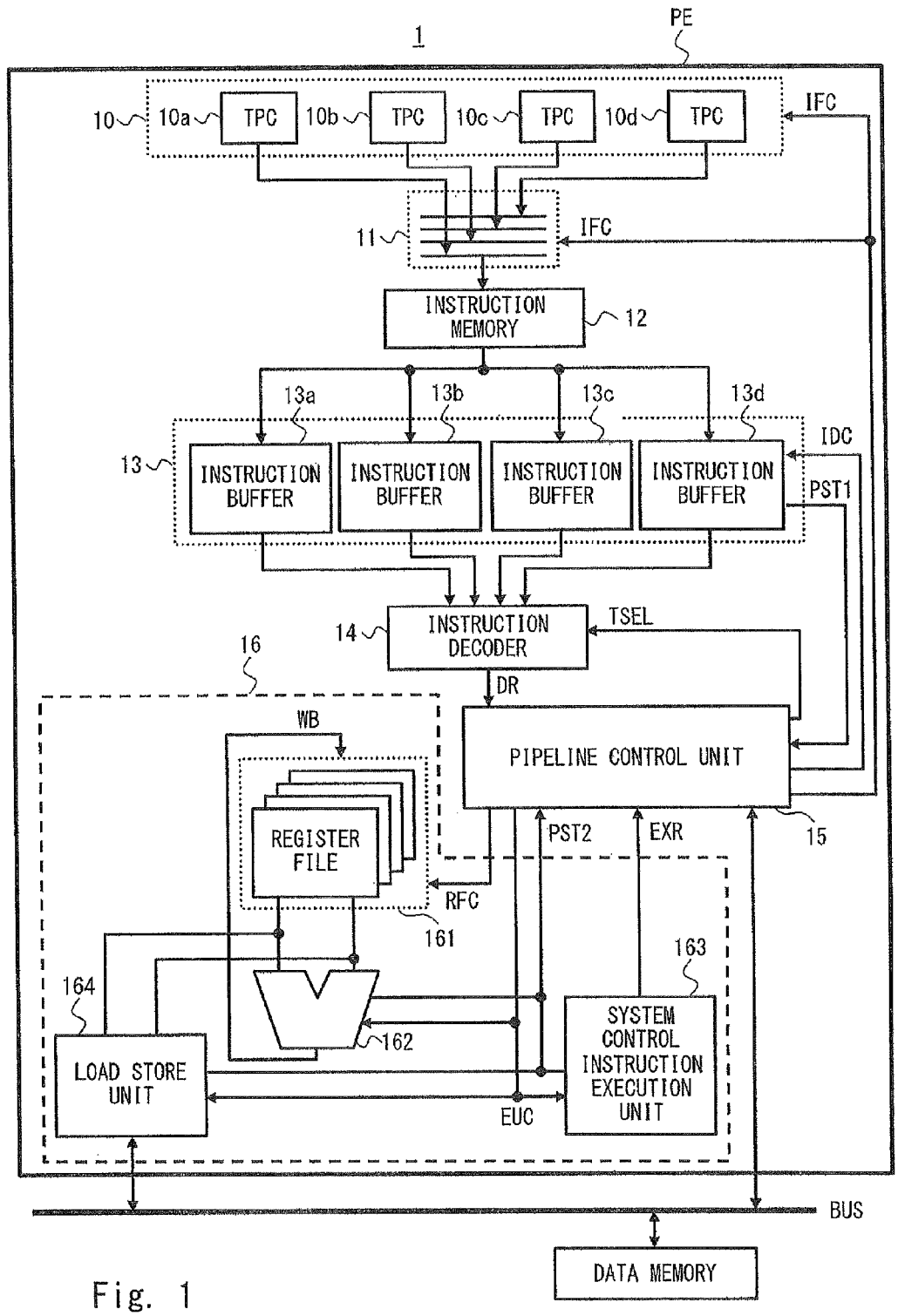
FIG. 1 is a block diagram of a semiconductor device according to a first embodiment.

FIG. 1 shows a block diagram of a semiconductor device 1 according to a first embodiment of the present invention. As shown in FIG. 1, the semiconductor device 1 includes a processor element PE, a data memory, and a bus BUS. Further, in the semiconductor device 1, the processor element PE and peripheral devices including the data memory are mutually connected through the bus BUS. Note that although only the data memory is shown as the peripheral device in FIG. 1, needless to say, the semiconductor device may also include other peripheral devices (not shown) such as a timer.

The processor element PE includes a program counter 10, a selector 11, an instruction memory 12, an instruction buffer 13, an instruction decoder 14, a pipeline control unit 15, and an execution unit 16.

The program counter 10 includes thread program counters 10a to 10d. Each of the thread program counters 10a to 10d generates a program counter value that indicates a place at which the instruction code to be fetched from the instruction memory 12 into the instruction buffer 13 is stored. Since the semiconductor device 1 according to the first embodiment includes four hardware threads, four thread program counters are shown in the program counter 10 in FIG. 1. Note that each of the thread program counters 10a to 10d increments or changes the program counter value according to an instruction fetch control signal IFC.

The selector 11 selects one of the program counter values generated by the thread program counters 10a to 10d according to the instruction fetch control signal IFC and outputs the selected program counter value to the instruction memory 12. The instruction memory 12 outputs an instruction code stored in the area corresponding to the program counter value output from the selector 11, to the instruction buffer 13.

The instruction buffer 13 includes four instruction buffers 13a to 13d, corresponding to the four threads to be executed in the semiconductor device 1. Further, the instruction buffer 13 stores an instruction code output from the instruction memory 12 into one of the instruction buffers 13a to 13d according to an instruction decode control signal IDC. Further, the instruction buffer 13 outputs a pipeline status signal PST1 that includes information indicating the state of the stored instruction code. Note that each of the instruction buffers 13a to 13d is a FIFO (First In First Out) type memory.

The semiconductor device 1 generates four independent instruction flows by using the program counter 10, the selector 11, and the instruction buffer 13. The circuit configuration for generating independent instruction flows like the configuration described above is referred to as "hardware thread". Further, in the semiconductor device 1, a plurality of hardware threads are logically assigned to virtual machines, and by doing so, a plurality of virtual machines are defined. That is, each of the plurality of virtual machines defined in the semiconductor device 1 according to the first embodiment issues an instruction code belonging to an instruction flow corresponding to a program.

The instruction decoder 14 decodes an instruction code and thereby generates instruction information. More specifically, the instruction decoder 14 reads out an instruction code from one of the instruction buffers 13a to 13d according to a thread select signal TSEL, generates instruction information by decoding the read instruction code, and outputs the generated instruction information as a decoding result DR.

The pipeline control unit 15 controls the order of instruction codes to be processed in the pipeline processing. More specifically, the pipeline control unit 15 issues a specific operation instruction (for example, outputs an execution unit control signal EUC) to the execution unit 16 based on the decoding result DR. Further, the pipeline control unit 15 generates a thread select signal TSEL, an instruction decode control signal IDC, and an instruction fetch control signal IFC according to a pipeline status signal PST1 output from the instruction buffer 13, a pipeline status signal PTS2 output from the execution unit 16, and instruction execution information EXR. Note that the pipeline status signals indicate the execution state of the instruction that is being processed through the pipeline, and include information about the presence/absence of an occurrence of cache mishift, the presence/absence of an occurrence of an exception handling, the satisfaction/non-satisfaction of a branch condition, and the like.

Further, the pipeline control unit 15 includes a register(s) for defining the presence/absence of an authority to execute a first privilege program (e.g., hypervisor stub program) that is executed on one virtual machine for each virtual machine. Further, the pipeline control unit 15 refers to the register, and when the virtual machine that has issued an instruction code relating to a hypervisor stub program has an authority to execute the hypervisor stub program, instructs the execution unit 16 to execute a process based on an instruction code relating to a hypervisor program, based on an operation of the hypervisor stub program. Note that the hypervisor stub program is executed within an execution time assigned to one virtual machine, and the hypervisor program is executed by exclusively using the execution time of the execution unit 16.

On the other hand, when the virtual machine that has issued an instruction code relating to a hypervisor stub program does not have an authority to execute the first privilege program, the pipeline control unit 15 determines that an execution authority exception has occurred in the virtual machine that has issued the instruction code relating to the hypervisor stub program. Then, the pipeline control unit 15 instructs the virtual machine that has issued the instruction code relating to the hypervisor stub program to perform an exception handling. Specifically, the pipeline control unit 15 instructs to execute an exception handling as a process for a guest OS (Operating System) by outputting the instruction decode control signal IDC, the instruction fetch control signal IFC, and the like. Note that details of the guest OS will be explained later.

Further, the register(s) of the pipeline control unit 15 according to the first embodiment includes a value (s) for defining the presence/absence of an authority to execute a hypervisor program for each virtual machine. Further, the pipeline control unit 15 refers to the register, and when the virtual machine that has issued an instruction code relating to a hypervisor program has an authority to execute the hypervisor program, instructs the execution unit 16 to execute a process based on the instruction code so that the operation of the hypervisor program is continued.

On the other hand, when the virtual machine that has issued an instruction code relating to a hypervisor program does not have an authority to execute the hypervisor program, the pipeline control unit 15 determines that an execution authority exception has occurred in the virtual machine that has issued the instruction code relating to the hypervisor program. Then, the pipeline control unit 15 instructs the virtual machine that has issued the instruction code relating to the hypervisor program to perform an exception handling. Specifically, the pipeline control unit 15 instructs to execute an exception handling as a process for a guest OS by outputting the instruction decode control signal IDC, the instruction fetch control signal IFC, and the like.

More detailed explanation of the pipeline control unit 15 will be made later.

The execution unit 16 performs an operation based on instruction information through pipeline processing. In the example shown in FIG. 1, the execution unit 16 includes a register file 161, an arithmetic unit 162, a system control instruction execution unit 163, and a load store unit 164.

In the register file 161, data that are used in operations performed in the arithmetic unit 162 are stored. This register file 161 includes an independent data storage area for each hardware thread. Note that in the register file 161, a place at which data is written and a place at which data is read are specified based on a register control signal RFC.

The arithmetic unit 162 executes an operation based on an execution unit control signal EUC output from the pipeline control unit 15. The arithmetic unit 162 performs various operations including addition, subtraction, multiplication, and division. Further, the arithmetic unit 162 writes an operation result into the register file 161 by using a write back signal WB. Further, the arithmetic unit 162 outputs a pipeline status signal PST2 that indicates an instruction execution state.

The system control instruction execution unit 163 performs processing based on the execution unit control signal EUC when the execution unit control signal EUC is an execution instruction relating to a system control instruction. For example, the system control instruction execution unit 163 performs processing relating to certain instructions such as an HVTRAP instruction and an HVCALL instruction, which are call instructions for a program having a privilege level. Further, the system control instruction execution unit 163 outputs a processing result as instruction execution information EXR. This instruction execution information EXR is a signal that indicates what kind of processing the executed instruction was. For example, the instruction execution information EXR includes a virtual machine identifier indicating a virtual machine that has issued a processed instruction, an HVTRAP instruction signal indicating that an HVTRAP instruction has been executed, an HVCALL instruction signal indicating that an HVCALL instruction has been executed, and an HV stub execution state signal indicating an execution state of a hypervisor stub program called by an HVCALL instruction. Further, the system control instruction execution unit 163 outputs a pipeline status signal PST2 that indicates an instruction execution state. Note that the HVTRAP instruction is an instruction to call a hypervisor program, and the HVCALL instruction is an instruction to call a hypervisor stub program.

The load store unit 164 performs a process for reading data from other memories such as the data memory based on the execution unit control signal EUC (e.g., load process), and a process for writing data stored in the register file into other memories such as the data memory (e.g., store process). Further, the load store unit 164 outputs a pipeline status signal PST2 that indicates an instruction execution state.

The semiconductor device 1 according to the first embodiment starts a hypervisor program through a hypervisor stub program when access that is instructed by a user program (e.g., user application) or a guest OS is emulated by the hypervisor program.

The semiconductor device 1 according to the first embodiment determines the validity of the caller program that has called the hypervisor stub program by executing the hypervisor stub program. Then, when the request instructed by the caller program is valid, the pipeline control unit 15 instructs the execution unit 16 to execute a process based on an instruction code relating to the hypervisor program, based on the operation of the hypervisor stub program.

Further, the semiconductor device 1 according to the first embodiment monitors the operation of other virtual machines (e.g., virtual machine other than the virtual machine that issues the instruction code relating to the hypervisor stub program) by the operation of the hypervisor stub program. Further, the pipeline control unit 15 defers instructing the execution unit 16 to execute the process based on the instruction code relating to the hypervisor program until the state where the operation of other virtual machines can be stopped.

Figure 2:
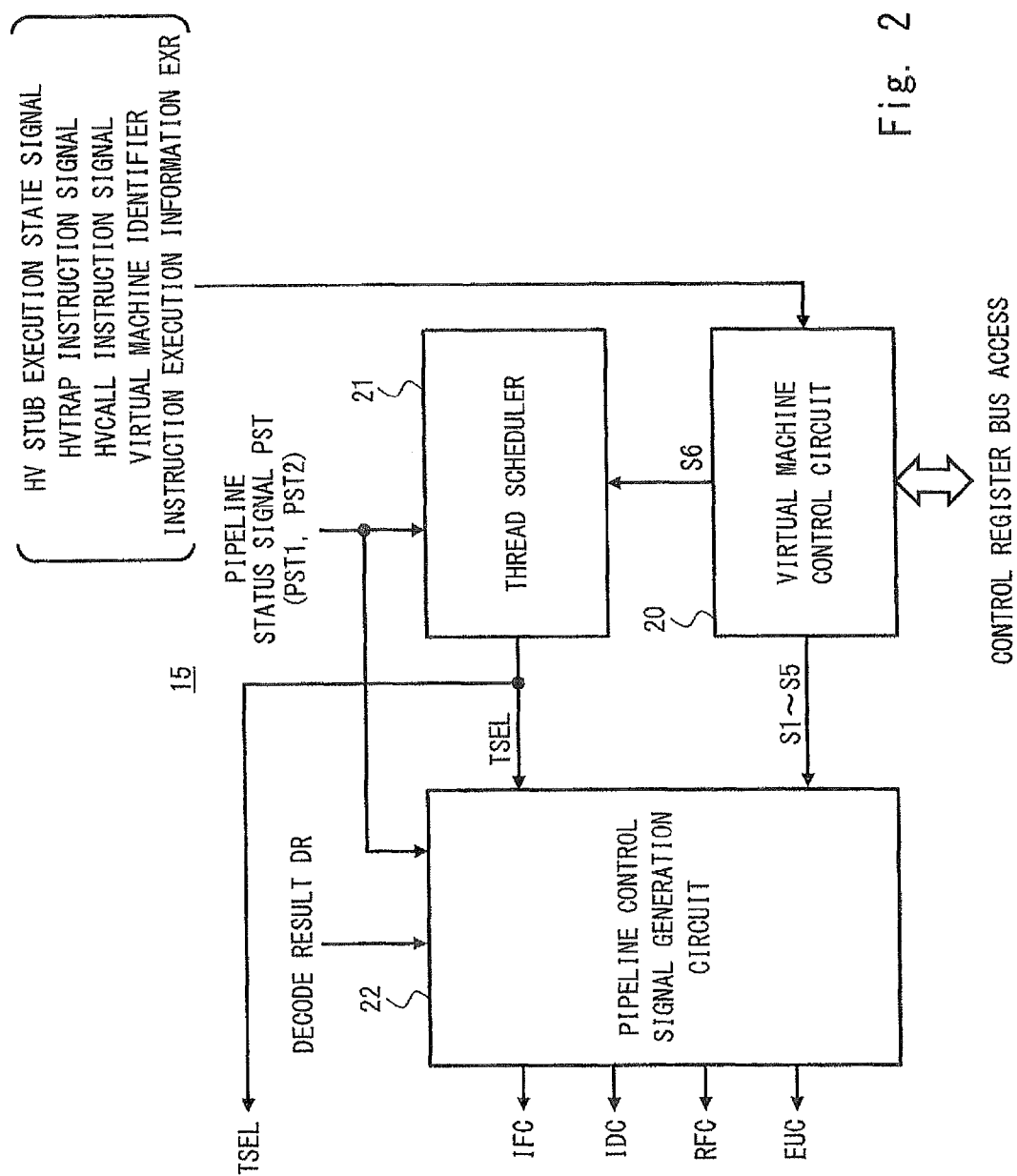
FIG. 2 is a block diagram of a pipeline control unit according to a first embodiment.

Next, the pipeline control unit 15 is explained in detail. FIG. 2 shows a block diagram of the pipeline control unit 15. As shown in FIG. 2, the pipeline control unit 15 includes a virtual machine control circuit 20, a thread scheduler 21, and a pipeline control signal generation circuit 22.

The virtual machine control circuit 20 controls the operation states of virtual machines defined on the processor element PE. More specifically, the virtual machine control circuit 20 outputs signals S1 to S5 that indicates whether or not the execution of an HVCALL instruction or an HVTRAP instruction has been started in one of a plurality of virtual machines. Further, the virtual machine control circuit 20 outputs a signal S6 that indicates whether the processor element PE is in a virtual machine mode where a program(s) are executed in parallel by a plurality of virtual machines or in a native mode where a program is executed in such a manner that the execution time of the execution unit 16 is exclusively used. Details of the virtual machine control circuit 20 will be explained later. Note that in the following explanation, a signal S1 represents a virtual machine identifier; a signal S2 represents an HVCALL execution notification signal; a signal S3 represents an HVTRAP execution notification signal; a signal S4 represents an HVCALL execution authority exception signal; a signal S5 represents an HVTRAP execution authority exception signal; and a signal S6 represents a real machine operation signal.

The thread scheduler 21 schedules an instruction to be put into the execution unit 16 from a plurality of hardware threads. More specifically, the thread scheduler 21 determines the hardware thread that should issues the next instruction code to the execution unit 16 based on the real machine operation signal S6, the schedule that is defined in advance inside the thread scheduler 21, and the pipeline status signal PST (signal including pipeline status signals PST1 and PST2). Then, the thread scheduler 21 outputs a thread select signal TSEL indicating the determined hardware thread.

The pipeline control signal generation circuit 22 controls the pipeline based on the thread select signal TSEL, the pipeline status signal PST, the virtual machine identifier S1, the HVCALL execution notification signal S2, the HVTRAP execution notification signal S3, the HVCALL execution authority exception signal S4, the HVTRAP execution authority exception signal S5, the decoding result DR, and the like. When the pipeline control signal generation circuit 22 controls the pipeline, the pipeline control signal generation circuit 22 generates an instruction fetch control signal IFC, an instruction decode control signal IDC, a register control signal RFC, and an execution unit control signal EUC. The instruction fetch control signal IFC is a signal specifying the hardware thread that fetches the next instruction code. The instruction decode control signal IDC is a signal specifying the next instruction code to be put into the pipeline. The register control signal RFC is a signal indicating a position in the register file at which a value that is used when the execution unit 16 performs an operation is stored, and a position in the register file into which a calculated value is written. The execution unit control signal EUC is a signal indicating what kind of processing is performed in the execution unit 16.

Figure 3:
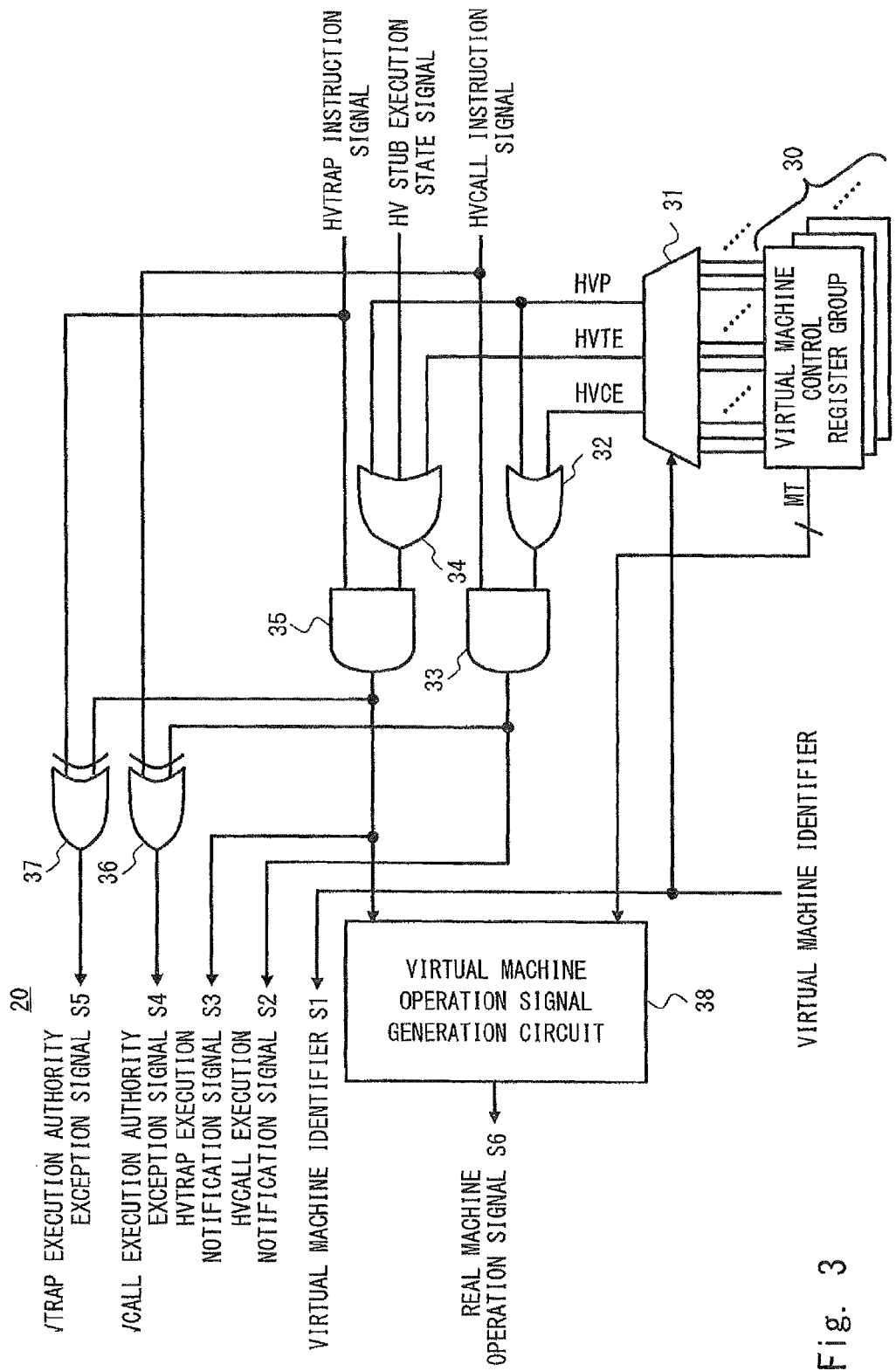
FIG. 3 is a block diagram of a virtual machine control circuit according to a first embodiment.

Next, details of the virtual machine control circuit 20 are explained. FIG. 3 shows a detailed block diagram of the virtual machine control circuit 20. As shown in FIG. 3, the virtual machine control circuit 20 includes a virtual machine control register group 30, a selector 31, OR circuits 32 and 34, AND circuits 33 and 35, ExOR circuits 36 and 37, and a virtual machine operation signal generation circuit 38.

The virtual machine control register group 30 includes a plurality of registers (hereinafter referred to as "virtual machine control registers") that are used to define an authority to execute a first privilege program (e.g., hypervisor stub program) and an authority to execute a second privilege program (e.g., hypervisor program) for each virtual machine. Further, the virtual machine control registers include virtual machine enable flags that indicate, for each machine, whether the operation of the virtual machine should be enabled or disabled, and HV privilege flags that indicate whether access to the resource that can be operated only by the hypervisor program should be permitted to the virtual machine or not. Details of the virtual machine control register group 30 will be explained later.

The selector 31 selects one of a plurality of virtual machine control registers according to the virtual machine identifier, and outputs a value(s) stored in the selected virtual machine control register. Note that the virtual machine identifier is a signal included in the instruction execution information EXR.

The OR circuit 32 outputs the logical sum operation result between an HVCALL permission flag HVCE and an HV privilege flag HVP included in the virtual machine control register. The AND circuit 33 outputs the logical multiplication operation result between the output of the OR circuit 32 and an HVCALL instruction signal. Then, the output of the AND circuit 33 becomes an HVCALL execution notification signal S2. Note that the HVCALL execution notification signal S2 indicates an execution state (e.g., "1") when the HVCALL permission flag HVCE is in an enabled state (e.g., "1") and the HVCALL instruction signal becomes an execution notification state (e.g., "1"). However, the HVCALL execution notification signal S2 indicates a non-execution state (e.g., "0") even when the HVCALL instruction signal becomes an execution notification state (e.g., "1") in a state where the HV privilege flag HVP is in a disabled state (e.g., "0") and the HVCALL permission flag HVCE is in a disabled state (e.g., "0").

The OR circuit 34 outputs the logical sum operation result of an HVTRAP permission flag HVTE included in the virtual machine control register, an HV privilege flag HVP, and an HV stub execution state signal. The AND circuit 35 outputs the logical multiplication operation result between the output of the OR circuit 34 and an HVTRAP instruction signal. Then, the output of the AND circuit 33 becomes an HVTRAP execution notification signal S3. Note that the HVTRAP execution notification signal S3 indicates an execution state (e.g., "1") when the HVTRAP permission flag HVTE is in an enabled state (e.g., "1") and the HVTRAP instruction signal becomes an execution notification state (e.g., "1").

However, the HVTRAP execution notification signal S3 indicates a non-execution state (e.g., "0") even when the HVTRAP instruction signal becomes an execution notification state (e.g., "1") in a state where: the HV privilege flag HVP is in a disabled state; the HVTRAP permission flag HVTE is in a disabled state (e.g., "0"); and the HV stub execution state signal is a non-execution state (e.g., "0").

Further, the HVTRAP execution notification signal S3 indicates an execution state (e.g., "1") when the HV stub execution state signal is an execution state (e.g., "1") even when the HVTRAP instruction signal is in a non-execution notification state (e.g., "0") in a state where the HV privilege flag HVP is in a disabled state (e.g., "0") and the HVTRAP permission flag HVTE is in a disabled state (e.g., "0"). That is, the HVTRAP execution notification signal S3 becomes an execution state when an HVTRAP instruction is issued by a guest OS or when a guest OS issues an HVCALL instruction causing the execution of a hypervisor stub program and as a result an HVTRAP instruction is executed.

The ExOR circuit 36 outputs the exclusive-OR operation result between the HVCALL execution signal and the HVCALL execution notification signal S2 as an HVCALL execution authority exception signal S4. That is, the HVCALL execution authority exception signal S4 becomes an enabled state (e.g., "1") when a virtual machine having no authority to execute an HVCALL instruction has executed an HVCALL instruction. The ExOR circuit 37 outputs the exclusive-OR operation result between the HVTRAP execution signal and the HVTRAP execution notification signal S3 as an HVTRAP execution authority exception signal S5. That is, the HVTRAP execution authority exception signal S5 becomes an enabled state (e.g., "1") when a virtual machine having no authority to execute an HVTRAP instruction has executed an HVTRAP instruction.

The virtual machine operation signal generation circuit 38 generates a real machine operation signal S6 based on the HVTRAP execution notification signal S3 and a multi-thread operation bit MT in the virtual machine control register included in the virtual machine control register group 30. Note that details of the multi-thread operation bit MT will be explained later.

Note that the real machine operation signal S6 is a signal that becomes an enabled state (e.g., "1") when the virtual machine is in a disabled state and the execution time of the execution unit 16 is exclusively used by one of the hardware threads. For example, in the semiconductor device 1 according to the first embodiment, the real machine operation signal S6 becomes an enabled state when a hypervisor program is executed.

Next, the virtual machine control register group 30 is explained in detail. FIG. 4 shows a schematic diagram of virtual machine control registers included in the virtual machine control register group 30. As shown in FIG. 4, the number of virtual machine control registers provided in the virtual machine control register group 30 is determined according to the number of virtual machines to be defined. In the example shown in FIG. 4, two registers are used for every one virtual machine. Further, each virtual machine control register includes a virtual machine enable flag EN, an HV privilege flag HVP, an HVTRAP permission flag HVTE, and an HVCALL permission flag VHCE. For each of these flags, when its value is 1, it indicates that the flag is in an enabled state, whereas when its value is 0, it indicates that the flag is in a disabled state.

Further, in the semiconductor device 1 according to the first embodiment, the virtual machine control registers shown in FIG. 4 are implemented as a part of registers that store other settings. An example of the virtual machine control register is explained hereinafter. FIG. 5 shows a schematic diagram of a register in which, among the setting values of the virtual machine control register, the virtual machine enable flag EN is stored.

The register shown in FIG. 5 has a 32-bit data area. Further, in the register shown in FIG. 5, the virtual machine enable flag EN is stored in the field of the 31st bit. Further, the writing and the reading of this virtual machine enable flag EN are permitted when the processor has an HV privilege (e.g., hypervisor privilege) and the processor is in a mode where the processor performs a process for an information group relating to a virtual machine (e.g., virtual machine context VC). Further, only the reading of this virtual machine enable flag EN is permitted when the processor has an HV privilege (e.g., hypervisor privilege) and the processor operates in a mode other than the mode where the processor performs a process for the virtual machine context VC. Further, the initial value of the virtual machine enable flag EN is 1 in the information group relating to the overall operation of the processor (e.g., native context), and the initial value is 0 in the virtual machine context.

Further, in the register shown in FIG. 5, a multi-thread operation bit MT is stored in the field of the 30th bit. The writing and the reading of this multi-thread operation bit MT are permitted regardless of whether or not the processor has an HV privilege (e.g., hypervisor privilege). Further, the multi-thread operation bit MT is rewritten from 1 to 0 when the processor changes from the virtual machine mode to the native mode, and is rewritten from 0 to 1 when the processor changes from the native mode to the virtual machine mode. Further, the rewriting of the multi-thread operation bit MT is performed based on the operation of a program running on the processor. Note that the register shown in FIG. 5 includes other setting values. However, since they do not have any direct influence on the operation of the virtual machine control circuit 20, their explanation is omitted here.

Further, FIG. 6 shows a schematic diagram of a register in which, among the setting values of the virtual machine control register, the HV privilege flag HVP, the HVCALL permission flag HVCE, and the HVTRAP permission flag HVTE are stored. The register shown in FIG. 6 has a 32-bit data area. Further, in the register shown in FIG. 6, the HV privilege flag HVP is stored in the field of the second bit, and the HVCALL permission flag HVCE is stored in the field of the first bit. Further, the HVTRAP permission flag HVTE is stored in the field of the 0th bit. Further, the writing and the reading of these flags are permitted when the processor has an HV privilege and the processor is in a mode where the processor performs a process for the virtual machine context VC. Further, only the reading of these flags is permitted when the processor has an HV privilege and the processor operates in a mode other than the mode where the processor performs a process for the virtual machine context VC. Further, the initial values of these flags are 1 in the information group relating to the overall operation of the processor (e.g., native context), and the initial values are 0 in the virtual machine context. Note that the register shown in FIG. 6 includes other setting values. However, since they do not have any direct influence on the operation of the virtual machine control circuit 20, their explanation is omitted here.

By configuring the registers so that only a program(s) having a hypervisor privilege can rewrite values of the virtual machine control register as shown in FIGS. 5 and 6, it is possible to improve the reliability of the setting values.

Figure 7:
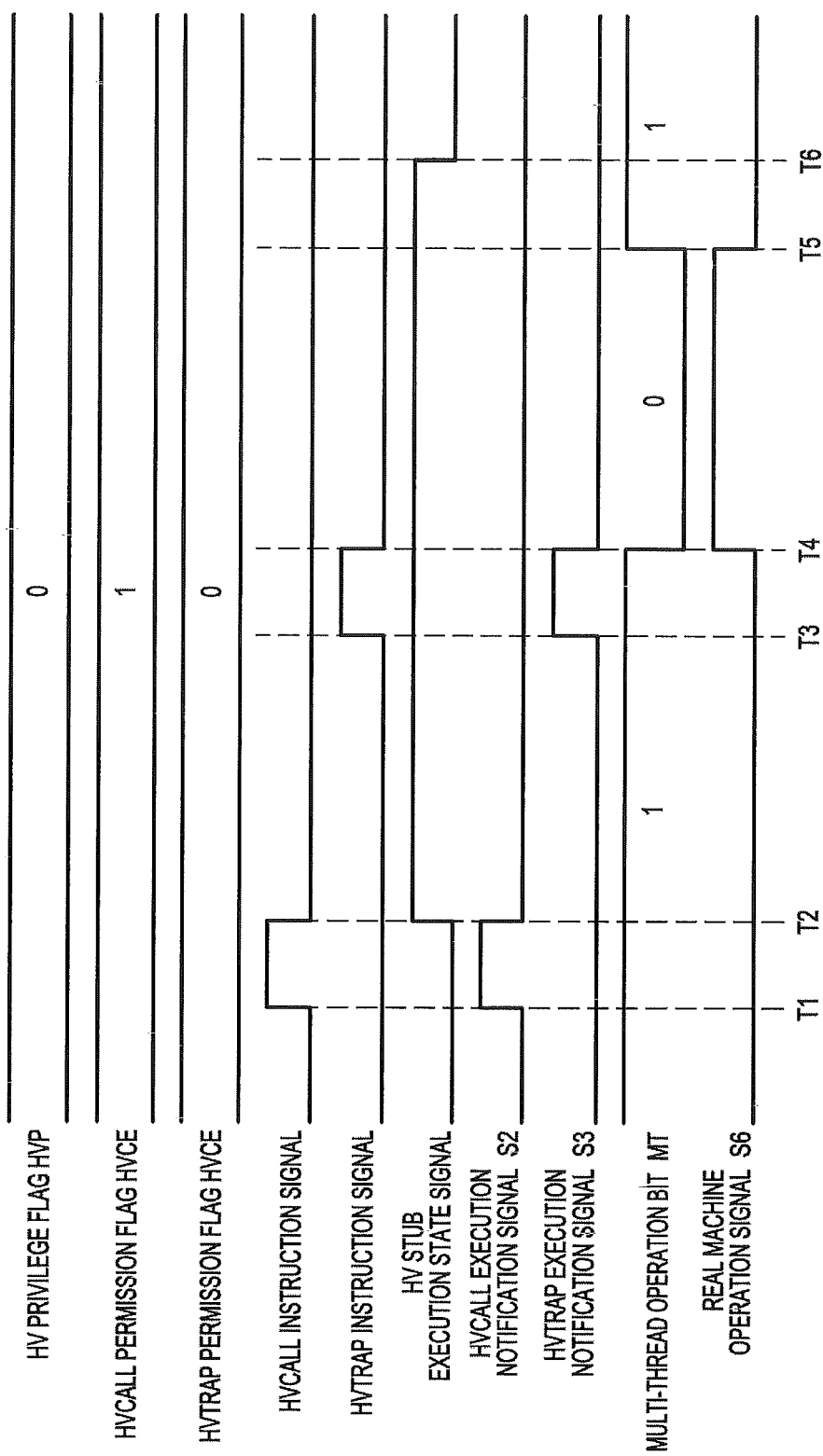
FIG. 7 is a timing chart showing an operation of a virtual machine control circuit according to a first embodiment.

An operation of the virtual machine control circuit 20 according to the first embodiment is explained hereinafter in a more detailed manner. FIG. 7 shows a timing chart showing an operation of the virtual machine control circuit 20 according to the first embodiment. Firstly, FIG. 7 shows an example in which a processor is operated based on a virtual machine control register in which: the HV privilege flag HVP is a disabled state; the HVCALL permission flag HVCE is in an enabled state; and the HVTRAP permission flag HVTE is in a disabled state (i.e., virtual machine control register corresponding to the virtual machine VM0 shown in FIG. 4).

In the example shown in FIG. 7, an HVCALL instruction signal becomes an execution notification state at a timing T1. Further, in response to the change of the HVCALL instruction signal to the execution notification state, the virtual machine control circuit 20 brings the HVCALL execution notification signal S2 into an execution state. Further, in response to the HVCALL instruction executed at the timing T1, a hypervisor stub program is executed at a timing T2 and subsequent timings. As a result, an HV stub execution state signal becomes an execution state at the timing T2.

Then, at a timing T3, an HVTRAP instruction is executed in the hypervisor stub program. As a result, an HVTRAP instruction signal becomes an execution notification state at the timing T3. At this point, in the example shown in FIG. 7, the HV stub execution state signal remains in the execution notification state at the timing T3. Therefore, the HVTRAP execution notification signal S3 is brought into an execution state in response to the change of the HVTRAP instruction signal to the execution notification state regardless of the value of the HVTRAP permission flag HVTE.

Then, in response to the execution of the HVTRAP instruction, the hypervisor program rewrites the multi-thread operation bit MT from 1 to 0 at the timing T4. As a result, the processor operates in the native mode until the multi-thread operation bit MT is rewritten to 1. Further, in response to the change of the HVTRAP execution notification signal S3 to the execution state that has occurred between the timing T3 and T4, the virtual machine control circuit 20 brings the real machine operation signal S6 into an enabled state at the timing T4.

Then, the hypervisor program that started at the timing T4 rewrites the multi-thread operation bit MT to 1 and thereby completes the operation at a timing T5. Further, in response to the rewriting of the multi-thread operation bit MT from 1 to 0, the virtual machine operation signal generation circuit 38 brings the real machine operation signal S6 into a disabled state. After that, at a timing T6, it brings the HV stub execution state signal into a non-execution notification state in response to the completion of the operation of the hypervisor stub program.

Figure 8:
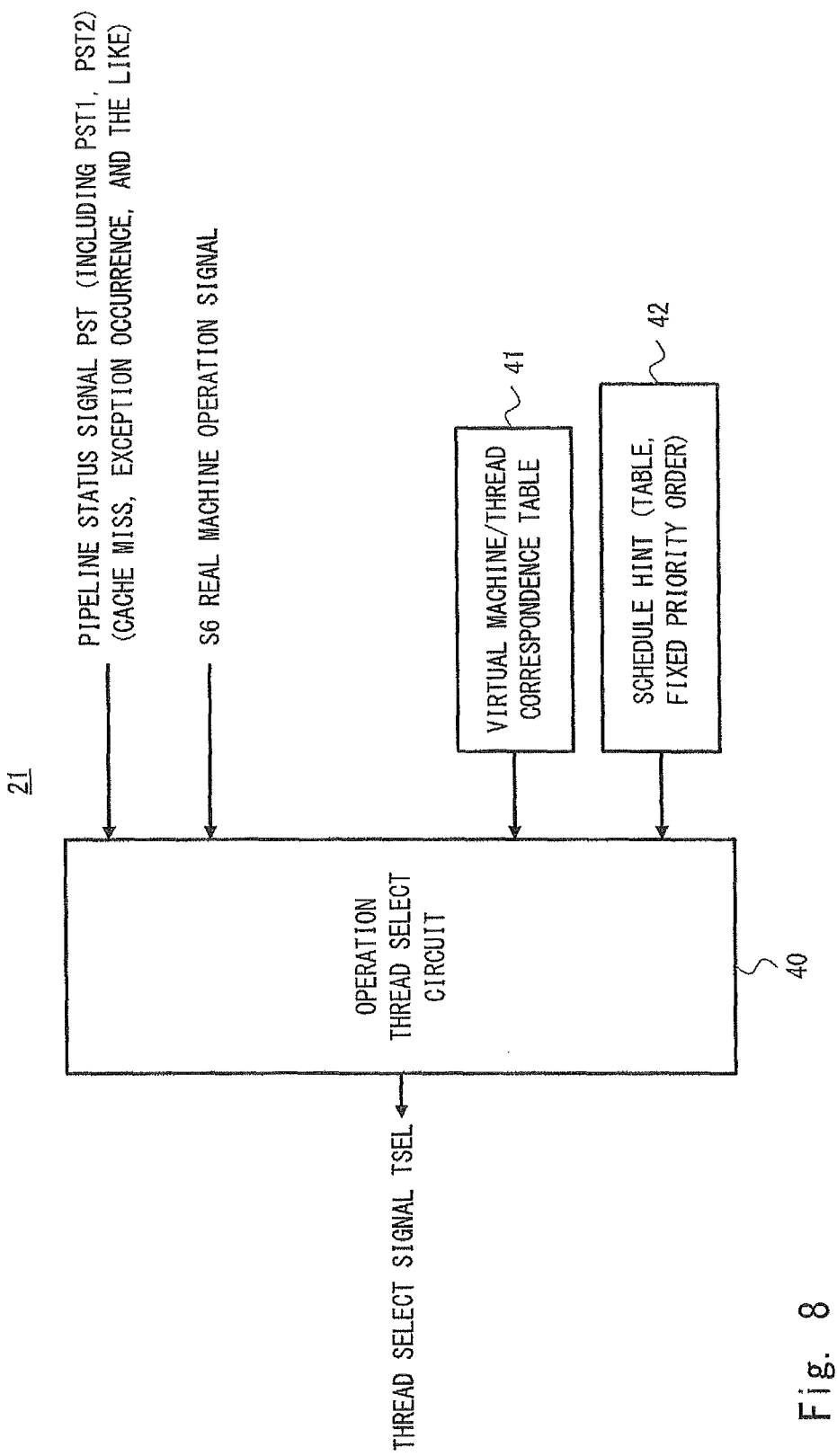
FIG. 8 is a block diagram of a thread scheduler according to a first embodiment.

Next, the thread scheduler 21 is explained in detail. FIG. 8 shows a detailed block diagram of the thread scheduler 21. As shown in FIG. 8, the thread scheduler 21 includes an operation thread select circuit 40, a virtual machine/thread correspondence table 41, and a schedule hint 42.

The virtual machine/thread correspondence table 41 may be stored, for example, in an internal memory or a register(s) of the processor element PE. The virtual machine/thread correspondence table 41 is a table showing correspondence between virtual machines and hardware threads.

The schedule hint 42 may be stored, for example, in an internal memory or a register(s) of the processor element PE. The schedule hint 42 is information that defines the order of hardware threads that generate instruction codes to be executed in the execution unit 16, hardware threads that should be preferentially processed, and the like. That is, in the semiconductor device 1 according to the first embodiment, hardware threads that are executed by virtual machines are defined based on the schedule hint 42 and the corresponding relation specified in the virtual machine/thread correspondence table 41. An exemplary embodiment of this schedule hint 42 is shown, for example, in Japanese Patent Application No. 2008-252232, which was filed by the applicant of the present application.

The operation thread select circuit 40 generates a thread select signal TSEL indicating a hardware thread that issues the next instruction code based on the real machine operation signal S6, the pipeline status signals PST1 and PST2, the virtual machine/thread correspondence table 41, and the schedule hint 42.

Figure 9:
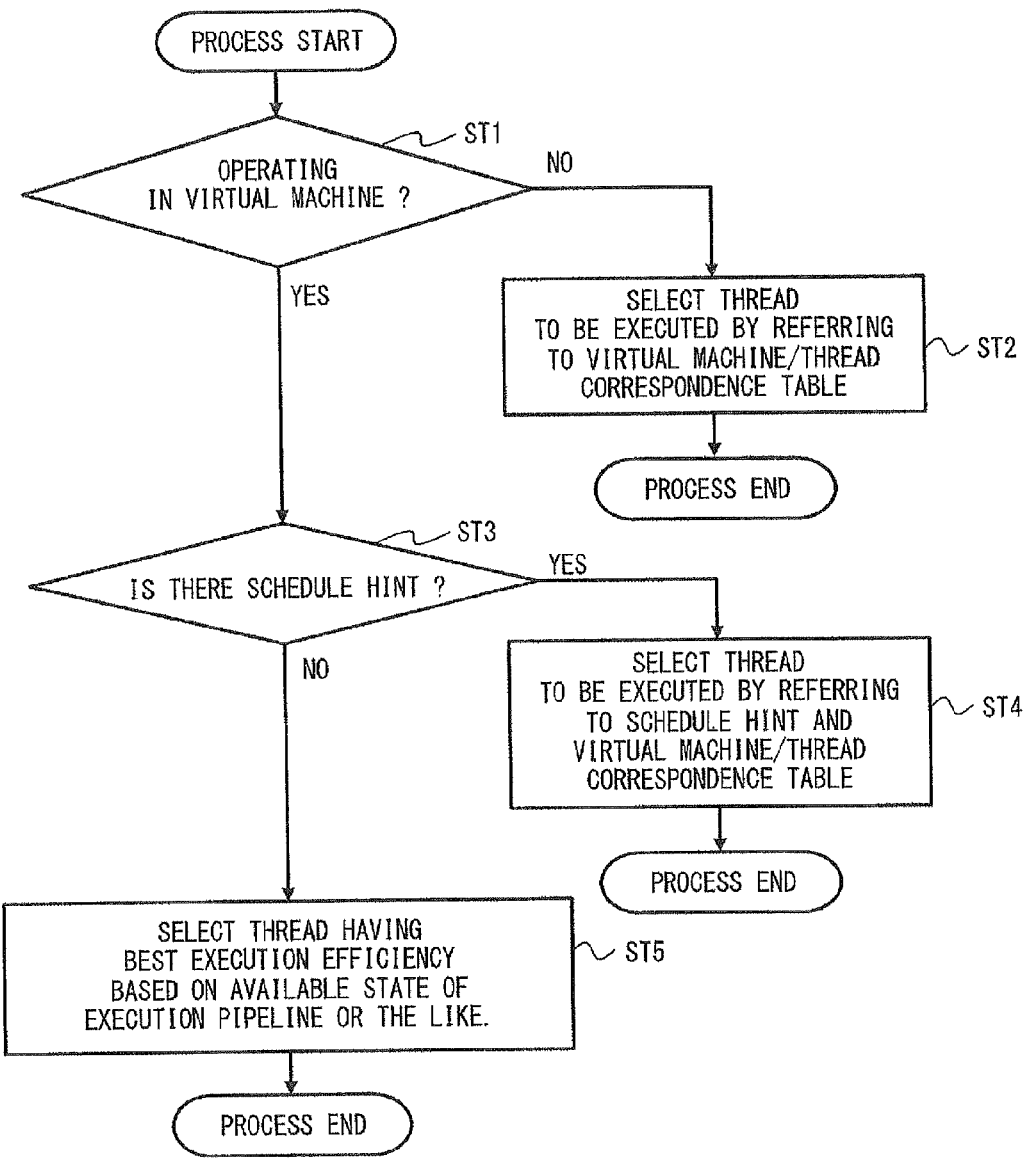
FIG. 9 is a flowchart showing an operation of a thread scheduler according to a first embodiment.

FIG. 9 is a flowchart showing a more specific operation of the operation thread select circuit 40.

As shown in FIG. 9, the operation thread select circuit 40 determines whether the processor element PE is operating in a virtual machine mode or in a native mode by referring to the real machine operation signal S6 (step ST1). Then, when it is determined that the processor element PE is operating in the native mode in the step ST1, the operation thread select circuit 40 selects the hardware thread to be executed by referring to the virtual machine/thread correspondence table 41 (step ST2).

On the other hand, when it is determined that the processor element PE is operating in the virtual machine mode in the step ST1, the operation thread select circuit 40 determines whether there is a schedule hint 42 or not (step ST3). Then, when it is determined that there is a schedule hint 42 in the step ST3, the operation thread select circuit 40 selects the hardware thread to be executed by referring to the schedule hint 42 and the virtual machine/thread correspondence table 41 (step ST4).

On the other hand, when it is determined that there is no schedule hint 42 in the step ST3, the operation thread select circuit 40 selects a hardware thread having the best execution efficiency based on the pipeline status signal PST (step ST5).

Next, an operation of the semiconductor device 1 according to the first embodiment is explained. In the following explanation, in particular, a calling process of a hypervisor stub program, which is one of the features of the semiconductor device 1 according to the first embodiment of the present invention, is explained.

Figure 10:
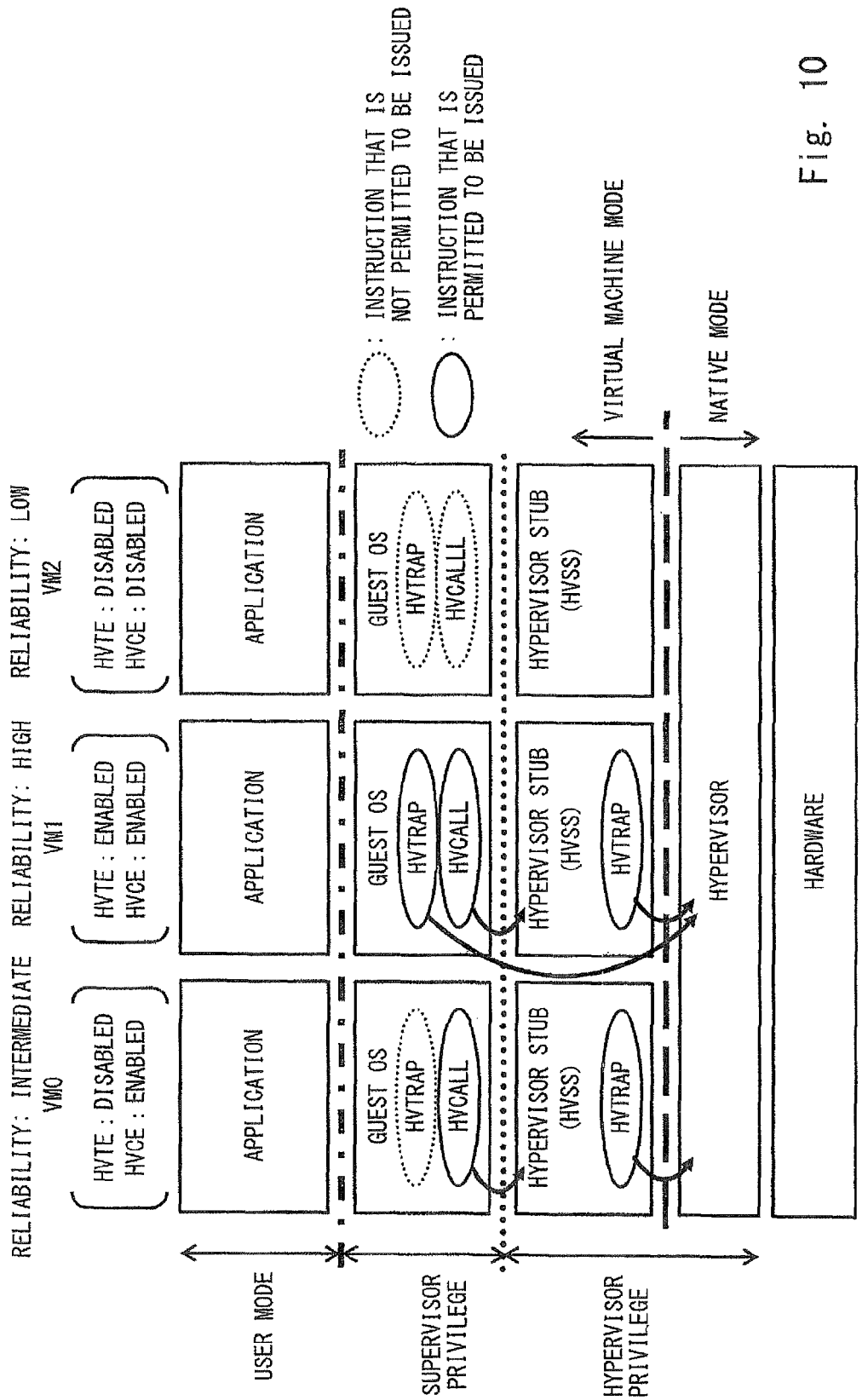
FIG. 10 shows an example of instructions for which execution is permitted in a semiconductor device according to a first embodiment, and an example of state transitions on a software layer that occur when permitted instructions are executed.

Firstly, FIG. 10 shows, in a case where the virtual machine control registers have settings shown in FIG. 4, an example of instructions that are permitted to be executed in the semiconductor device according to the first embodiment and an example of state transitions on a software layer that occur when permitted instructions are executed. As shown in FIG. 10, the semiconductor device 1 executes a user program that runs on one virtual machine, a supervisor program that manages the user program (e.g., guest OS), a hypervisor stub program that runs on one virtual machine and runs in response to a call from the supervisor program, and a hypervisor program that manages a plurality of supervisor programs. Note that in the semiconductor device 1 according to the first embodiment, the hypervisor stub program corresponds to the first privilege program and the hypervisor program corresponds to the second privilege program.

Further, in the semiconductor device 1, the hypervisor program is executed in a native mode, and the hypervisor stub program, a guest OS, and an application program are executed in a virtual machine mode. Further, the semiconductor device 1 operates in a user mode when an application program is executed, operates in a supervisor privilege level when a guest OS is executed, and operates in a hypervisor privilege level when a hypervisor stub program and a supervisor program are executed. Note that as for the reliability of the operating mode, a higher reliability is ensured for the user mode than that for the supervisor privilege level. Further, a higher reliability is ensured for the supervisor privilege level than that for the hypervisor privilege level.

Further, in the register setting example shown in FIG. 4, the semiconductor device 1 performs processing by using three virtual machines VM0 to VM2. Therefore, as shown in FIG. 10, in the semiconductor device 1, the virtual machines VM0 to VM2 perform processing independently of each other in the virtual machine mode.

Further, in the semiconductor device 1 according to the first embodiment, when access from an application program to a resource that requires a hypervisor privilege occurs, a hypervisor program is called by executing an HVTRAP instruction or an HVCALL instruction. In this process, in the semiconductor device 1, a guest OS issues the HVTRAP instruction or the HVCALL instruction based on an access request from the application program.

In the semiconductor device 1 that operates according to the register setting example shown in FIG. 4, it is possible to determine the method for calling the hypervisor program according to the reliability of the virtual machine. For example, in the example shown in FIG. 10, the virtual machine VM1 for which both the HVTRAP instruction permission flag HVTE and the HVCALL instruction permission flag HVCE are set to an enabled state has the highest reliability. Further, the executions of the HVCALL instruction and the HVTRAP instruction are permitted for the guest OS of the virtual machine VM1 based on the permission flag setting. Further, the guest OS of the virtual machine VM1 can call the hypervisor program directly by using the HVTRAP instruction without calling the hypervisor stub program by executing the HVTRAP instruction. Further, the guest OS of the virtual machine VM1 is also permitted to call the hypervisor stub program by using the HVCALL instruction and to call the hypervisor program from this hypervisor stub program.

Meanwhile, for the virtual machine VM0, the HVTRAP instruction permission flag HVTE is set to a disabled state and the HVCALL instruction permission flag HVCE is set to an enabled state. Therefore, the reliability of the virtual machine VM0 is lower than that of the virtual machine VM1. That is, the guest OS of the virtual machine VM0 is not permitted to directly call the hypervisor program by using the HVTRAP instruction based on the permission flag setting. Therefore, when the guest OS of the virtual machine VM0 calls the hypervisor program, it needs to call the hypervisor stub program by executing the HVCALL instruction and then call the hypervisor program from that hypervisor stub program. Further, for the virtual machine VM2, both the HVTRAP instruction permission flag HVTE and the HVCALL instruction permission flag HVCE are set to a disabled state. Therefore, the reliability of the virtual machine VM2 is lower than that of the virtual machine VM0. That is, no authority to execute the HVTRAP instruction and the HVCALL instruction is given to the guest OS of the virtual machine VM2 based on the permission flag setting. Therefore, the guest OS of the virtual machine VM2 can call neither the hypervisor program nor the hypervisor stub program.

That is, the semiconductor device 1 according to the first embodiment performs processing while switching the operating mode between the virtual machine mode in which a program (s) is performed in parallel by a plurality of virtual machines and the native mode in which a program is performed by exclusively using the execution time of the execution unit. Further, the semiconductor device 1 executes in the virtual machine mode: a user program having a user privilege level for which access to a specific hardware resource (s) is limited among hardware resources within the semiconductor device (e.g., registers, memories, and peripheral circuits, and the like); a supervisor program that manages the user program (e.g., guest OS); and a hypervisor stub program having a hypervisor privilege level which runs in response to a call from a guest OS and for which access to hardware resources including the specific hardware resource is permitted. Further, in the semiconductor device 1, the presence/absence of an authority to execute a first instruction code (e.g., HVCALL instruction), which calls a hypervisor stub program, is defined for a guest OS. Further, the hypervisor stub program starts in response to a call from a guest OS for which the execution of the HVCALL instruction is permitted. Further, the semiconductor device 1 calls a hypervisor program by executing a second instruction code (e.g., HVTRAP instruction) and thereby changes the operating mode to the native mode. Further, when a guest OS for which the execution of the HVCALL instruction is not permitted executes the HVCALL instruction, the semiconductor device 1 performs an exception handling within the guest OS without calling the hypervisor stub program.

Further, in the semiconductor device 1, the presence/absence of an authority to execute an HVTRAP instruction is set for a guest OS. Further, the semiconductor device 1 starts a hypervisor program in response to a call from a guest OS for which the execution of the HVTRAP instruction is permitted. Further, when a guest OS for which the execution of the HVTRAP instruction is not permitted executes the HVTRAP instruction, the semiconductor device 1 performs an exception handling within the guest OS without calling the hypervisor program.

Figure 11:
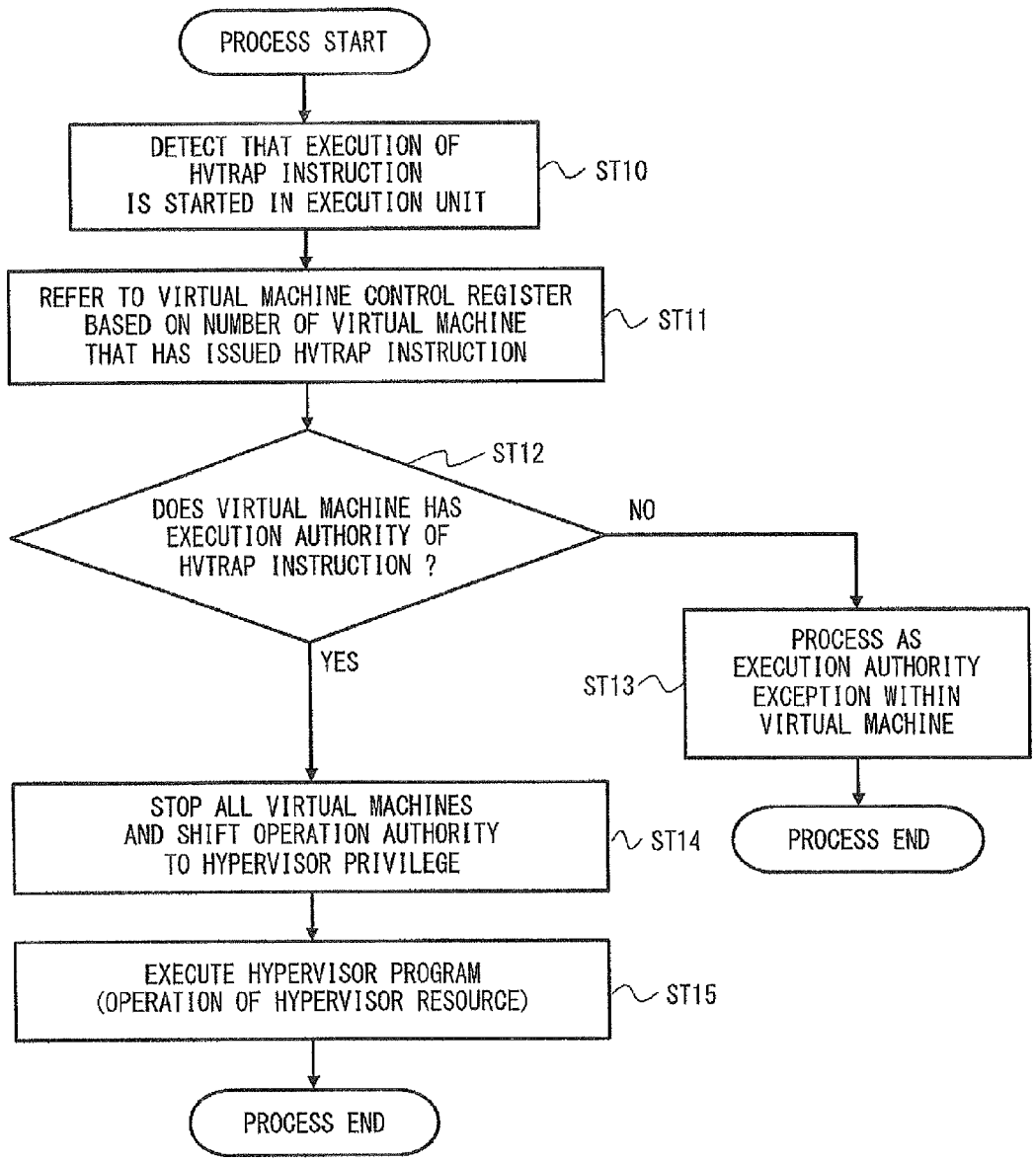
FIG. 11 is a flowchart showing an operation of a pipeline control unit that is performed when an HVTRAP instruction is executed in a semiconductor device according to a first embodiment.

Next, an operation of the semiconductor device 1 according to the first embodiment in a case where an HVTRAP instruction that directly calls a hypervisor program is executed is explained. FIG. 11 shows a flowchart showing an operation of the semiconductor device 1 according to the first embodiment in a case where an HVTRAP instruction is executed.

As shown in FIG. 11, in the semiconductor device 1 according to the first embodiment, when an HVTRAP instruction is executed by a guest OS, the pipeline control unit 15 detects that the execution of the HVTRAP instruction is started based on instruction execution information EXR output from the execution unit 16 (step ST10).

In a step ST11, the virtual machine control circuit 20 of the pipeline control unit 15 refers to a virtual machine control register corresponding to a virtual machine that has executed the HVTRAP instruction based on a virtual machine identifier indicating the number assigned to that virtual machine. Then, the virtual machine control circuit 20 determines whether or not the virtual machine that has executed the HVTRAP instruction has an authority to execute the HVTRAP instruction (step ST12). In this step ST12, when it is determined that the virtual machine does not have the authority to execute the HVTRAP instruction, the semiconductor device 1 recognizes that an execution authority exception has occurred and performs an error process as a process within the guest OS of the virtual machine (step ST13).

On the other hand, when it is determined that the virtual machine has the authority to execute the HVTRAP instruction, the semiconductor device 1 stops all the virtual machines and shifts the operation authority to the hypervisor privilege level (step ST14). More specifically, in this step ST14, the virtual machine control circuit 20 brings the real machine operation signal S6 into an enabled state. Further, the thread scheduler 21 selects a hardware thread to be executed from the virtual machine/thread correspondence table 41 in response to the change of the real machine operation signal S6 to the enabled state. Further, the pipeline control signal generation circuit 22 generates an instruction fetch control signal IFC, an instruction decode control signal IDC, a register control signal RFC, and an execution unit control signal EUC, which are used to execute the hypervisor program, in response to the HVTRAP execution notification signal S3. Further, upon completion of the process in the step ST14, the hypervisor program is executed in the semiconductor device 1 according to the first embodiment (step ST15).

Figure 12:
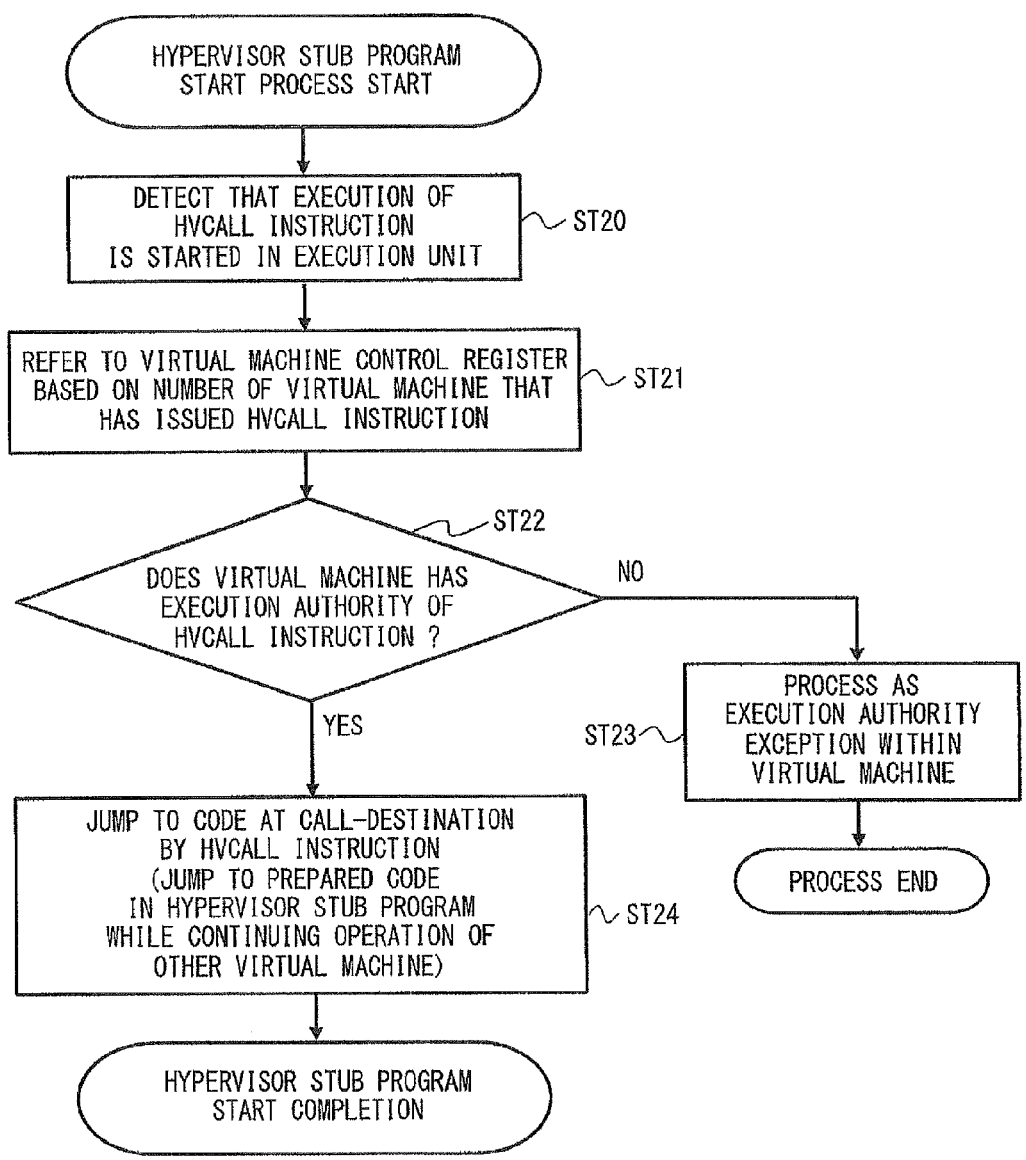
FIG. 12 is a flowchart showing a procedure for starting a hypervisor stub program by an HVCALL instruction in a semiconductor device according to a first embodiment.

Next, an operation of the semiconductor device 1 according to the first embodiment in a case where an HVCALL instruction that calls a hypervisor stub program is executed is explained. FIG. 12 shows a flowchart showing an operation of the semiconductor device 1 according to the first embodiment in a case where a hypervisor stub program is started by an HVCALL instruction.

As shown in FIG. 12, in the semiconductor device 1 according to the first embodiment, when an HVCALL instruction is executed by a guest OS, the pipeline control unit 15 detects that the execution of the HVCALL instruction is started based on instruction execution information EXR output from the execution unit 16 (step ST20).

Next, in a step ST21, the virtual machine control circuit 20 of the virtual machine control circuit 20 refers to a virtual machine control register corresponding to a virtual machine that has executed the HVCALL instruction based on a virtual machine identifier indicating the number assigned to that virtual machine. Then, the virtual machine control circuit 20 determines whether or not the virtual machine that has executed the HVCALL instruction has an authority to execute the HVCALL instruction (step ST22). In this step ST22, when it is determined that the virtual machine does not have the authority to execute the HVCALL instruction, the semiconductor device 1 recognizes that an execution authority exception has occurred and performs an error process within the virtual machine (step ST23).

On the other hand, when it is determined that the virtual machine has the authority to execute the HVCALL instruction, the semiconductor device 1 temporarily gives a hypervisor privilege to the virtual machine that has executed the HVCALL instruction. Further, the semiconductor device 1 continues the operation of other virtual machines while executing the hypervisor stub program in the virtual machine that has executed the HVCALL instruction. After that the semiconductor device 1 jumps to an instruction code prepared in the hypervisor stub program (step ST24). More specifically, in the step ST24, the virtual machine control circuit 20 maintains the real machine operation signal S6 in a disabled state. Then, the thread scheduler 21 selects a hardware thread to be executed based on the virtual machine/thread correspondence table 41 or the schedule hint 42 in response to the real machine operation signal S6 in the disabled state. Further, the pipeline control signal generation circuit 22 generates an instruction fetch control signal IFC, an instruction decode control signal IDC, a register control signal RFC, and an execution unit control signal EUC, which are used to execute the hypervisor stub program, in response to the HVCALL execution notification signal S2.

Then, the semiconductor device 1 completes the starting process of the hypervisor program by jumping to the instruction code that has been prepared in the hypervisor stub program in the step ST24.

Figure 13:
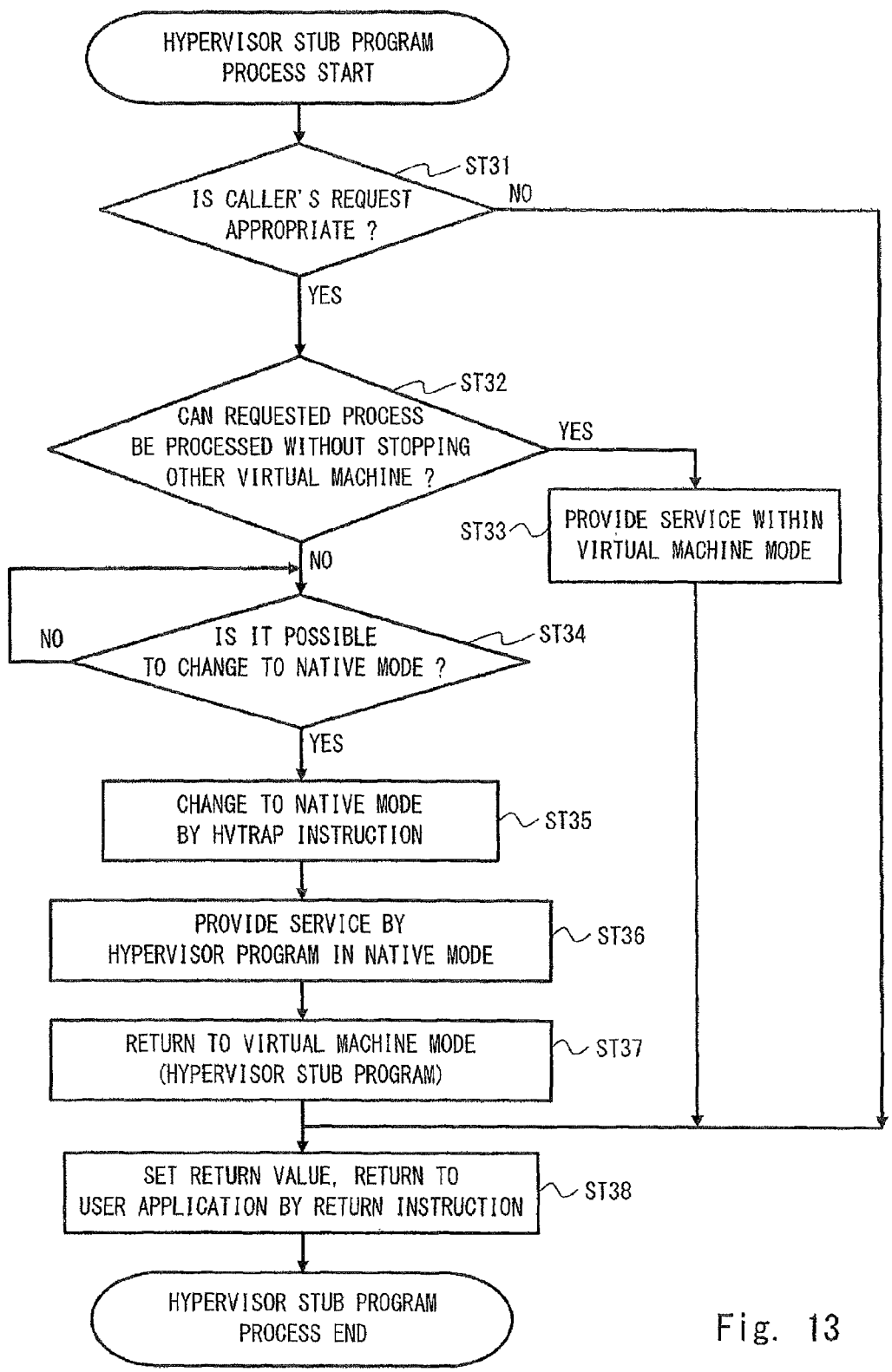
FIG. 13 is a flowchart showing an operation of a hypervisor stub program in a semiconductor device according to a first embodiment.

Note that as shown in FIG. 12, the semiconductor device 1 starts a hypervisor stub program by executing an HVCALL instruction. Then, the semiconductor device 1 calls a hypervisor program by the hypervisor stub program. Further, in this hypervisor stub program, processes for confirming the validity of a request from a caller, monitoring the operations of other virtual machines, and the like are performed. Therefore, an operation of the semiconductor device 1 based on a hypervisor stub program is explained hereinafter in detail. FIG. 13 shows a flowchart showing an operation of a hypervisor stub program in the semiconductor device according to the first embodiment.

As shown in FIG. 13, firstly, the semiconductor device 1 that executes a hypervisor stub program determines whether a request instructed by a caller is appropriate or not (step ST31). More specifically, in the step ST31, when an application program directly issues an HVCALL instruction without interposing any program having a supervisor privilege level such as a guest OS, it is determined that the request instructed by the caller is an unauthorized request.

Further, when it is determined that the request instructed by the caller is an unauthorized request in the step ST31, the hypervisor stub program sets an error number to the return value, issues a return instruction, and returns the process to the user application (step ST38). Further, when it is determined that the request instructed by the caller is an appropriate request in the step ST31, the hypervisor stub program determines whether or not the requested process can be processed without stopping other virtual machines (step ST32). For example, when the request is a setting change that affects only the virtual machine that has issued the HVCALL instruction, the requested process can be completed without stopping other virtual machines.

Further, when it is determined that the requested process can be processed without stopping other virtual machines in the step ST32, the semiconductor device 1 provides a service(s) by the hypervisor stub program within the virtual machine mode (step ST33). Then, after the process in the step ST33, the semiconductor device 1 sets a return value according to the process, issues a return instruction, and returns the process to the user application (step ST38). Further, when it is determined that the requested process cannot be processed without stopping other virtual machines in the step ST32, it is determined whether or not the semiconductor device 1 can be changed to the native mode (step ST34). For example, when the process (s) performed in the other virtual machines relates to a critical task that requires a real-time capability, it is impossible to stop the process(s) performed in the other virtual machines.

Further, when it is determined that the semiconductor device 1 can be changed to the native mode in the step ST34, the semiconductor device 1 proceeds to the process in a step ST35. In the step ST35, the hypervisor stub program issues an HVTRAP instruction and thereby changes the semiconductor device 1 to the native mode by the HVTRAP instruction. As a result, the semiconductor device 1 provides a service(s) by the hypervisor program in the native mode (step ST36). Note that in the semiconductor device 1, the process in the step ST36 is included in the process by the hypervisor program. Therefore, the hypervisor stub program is still in execution while the process in the step ST36 is being executed. Further, in the semiconductor device 1, the HVTRAP instruction that is issued by the hypervisor stub program is processed as a normal process even if the HVTRAP permission flag corresponding to the virtual machine is in a disabled state.

Then, when the process in the step ST36 has been completed, the semiconductor device 1 returns the operating mode from the native mode to the virtual machine mode and executes the hypervisor stub program (step ST37). After that, the semiconductor device 1, which is executing the hypervisor stub program, sets a return value according to the process, issues a return instruction, and returns the process to the user application (step ST38).

Figure 14:
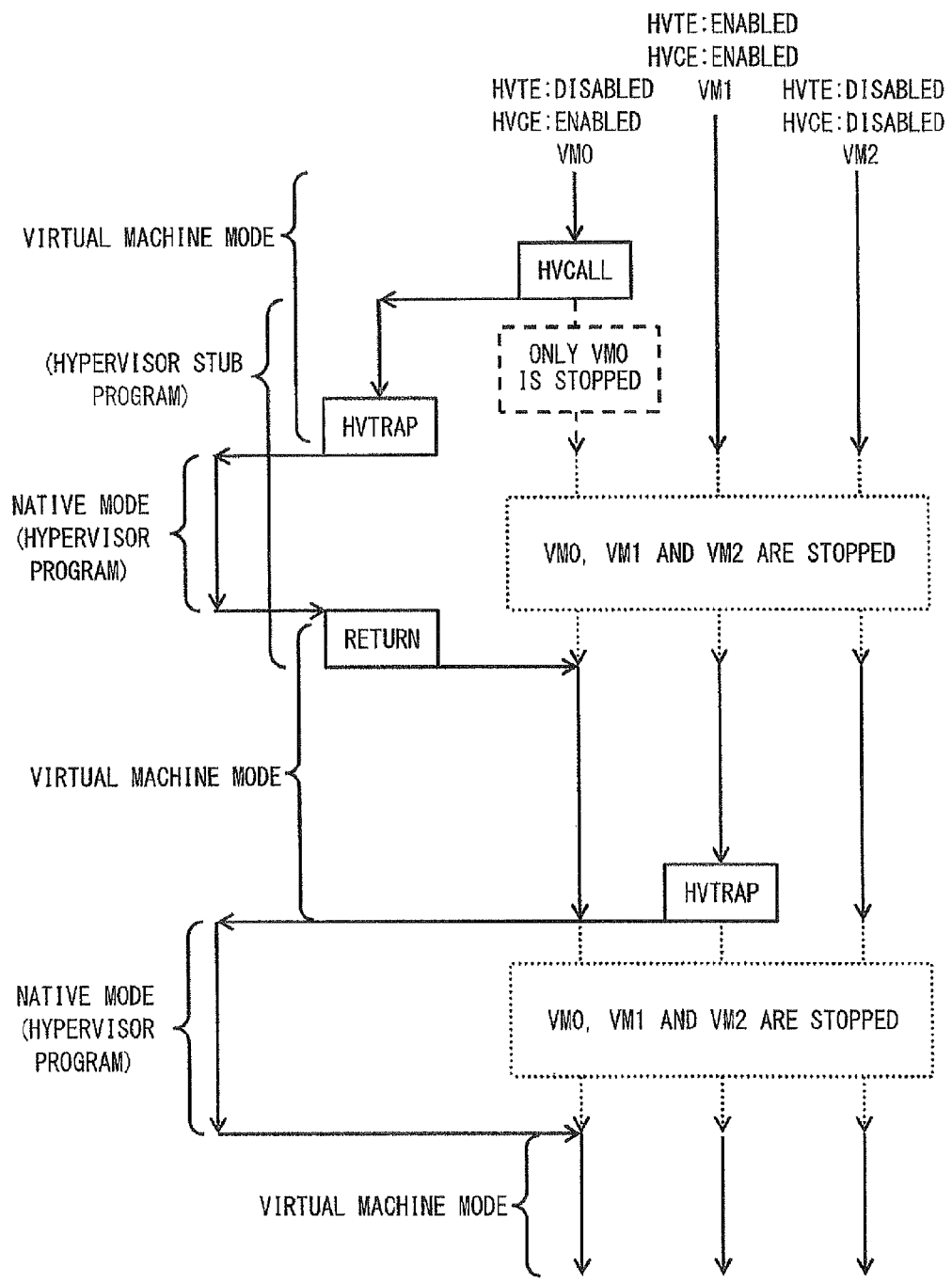
FIG. 14 is a sequence diagram showing an operation of a semiconductor device according to a first embodiment.
Figure 16:
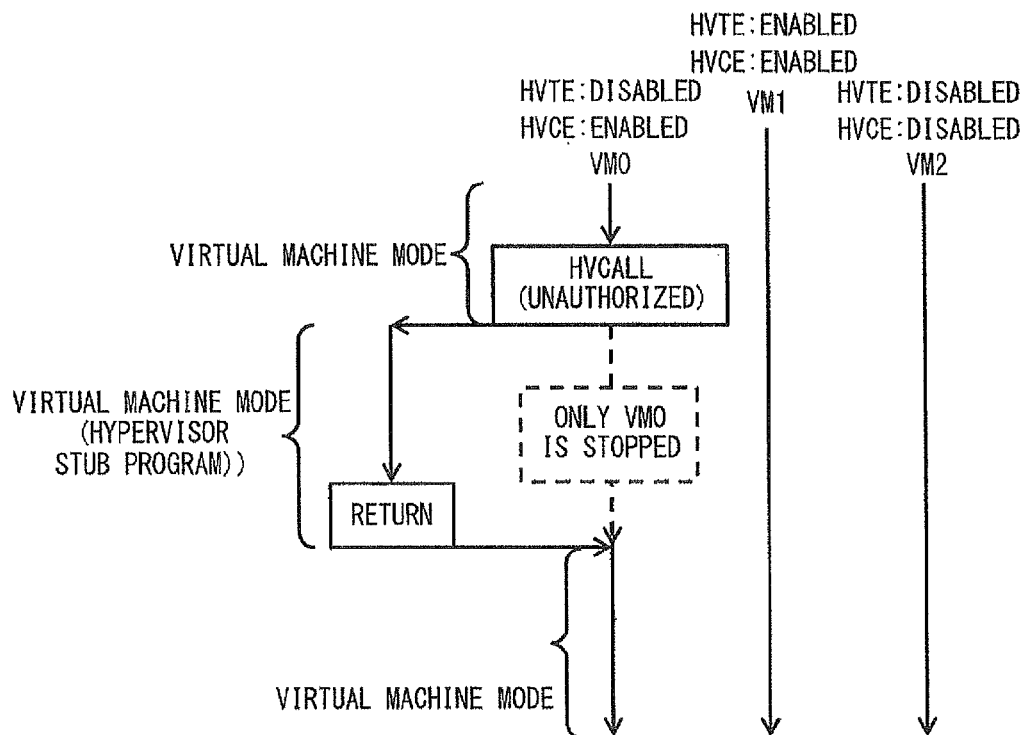
FIG. 16 is a sequence diagram showing an operation that is performed when an unauthorized call for a hypervisor stub program occurs in a semiconductor device according to a first embodiment.
Figure 17:
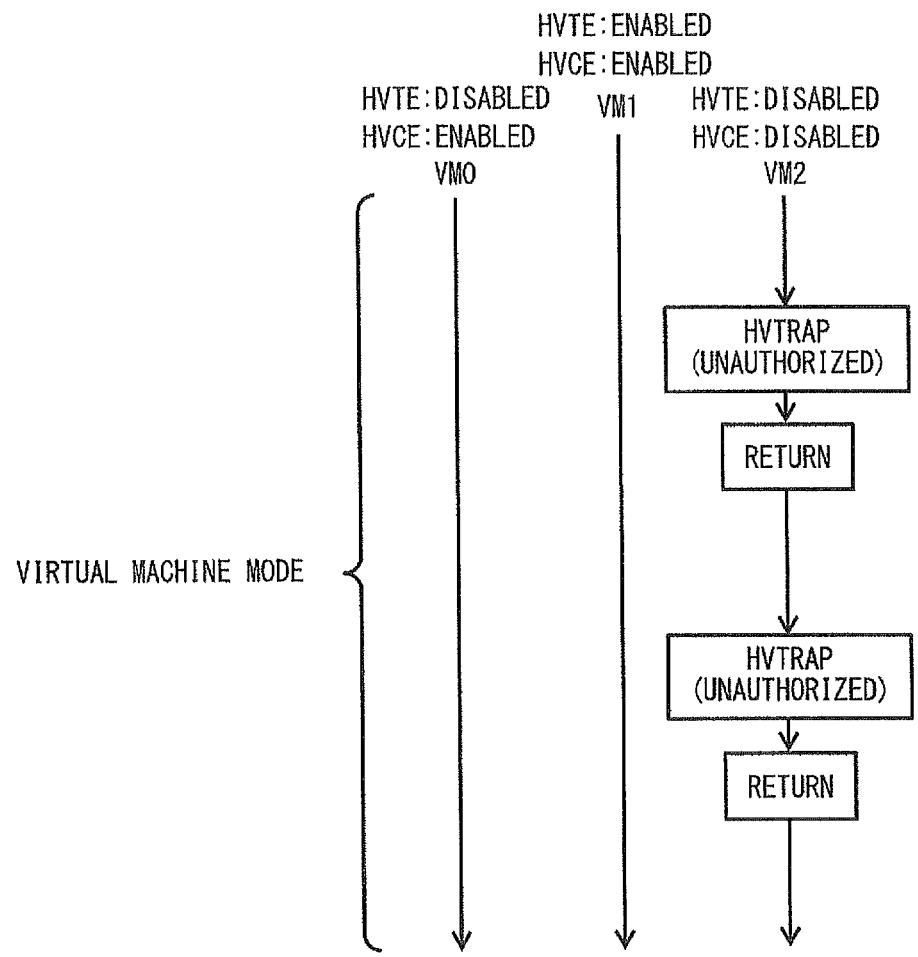
FIG. 17 is a sequence diagram showing an operation that is performed when a call for a hypervisor stub program or a hypervisor program occurs in a virtual machine to which an execution authority is not given in a semiconductor device according to a first embodiment.
Figure 18:
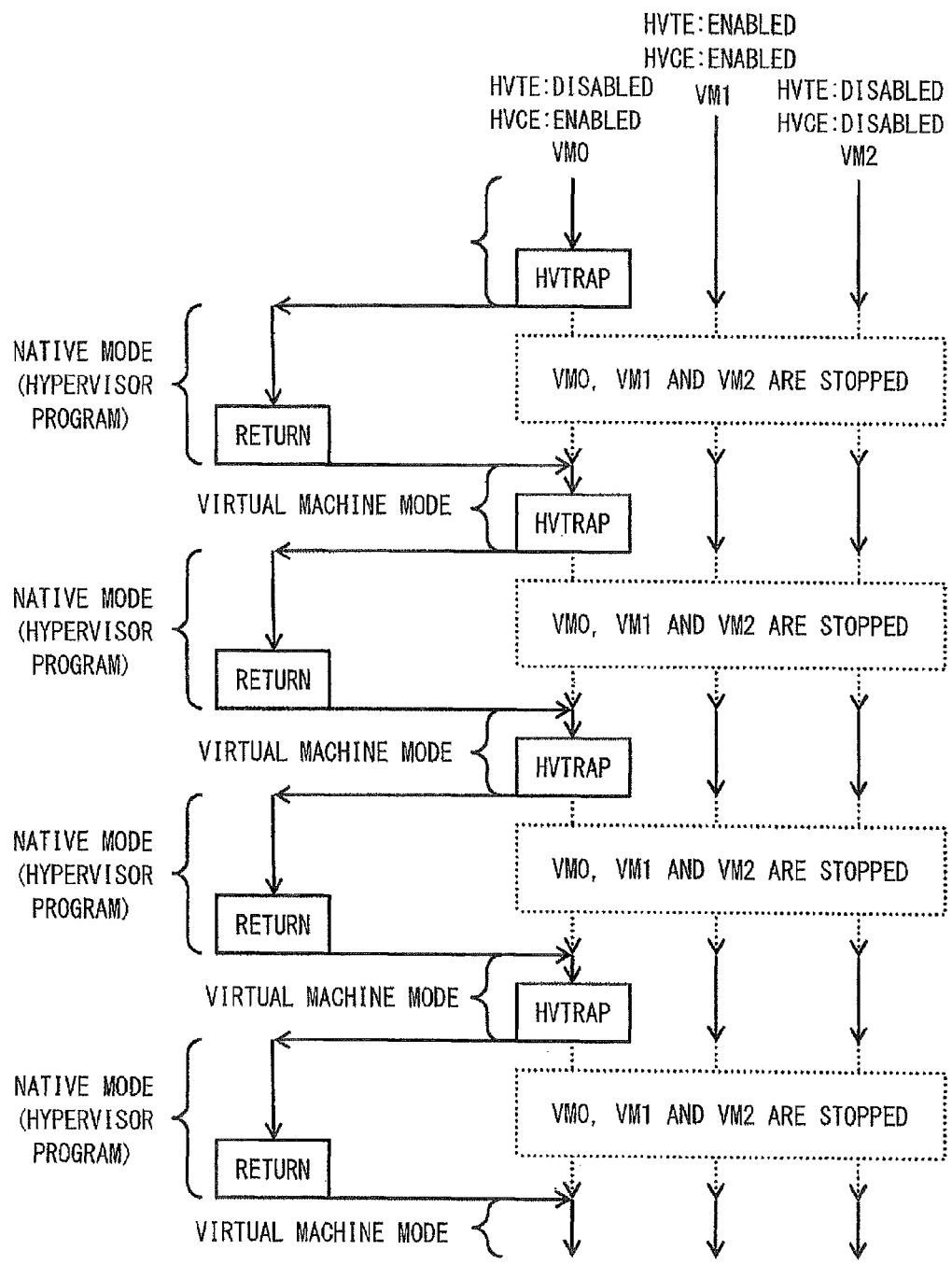
FIG. 18 is a sequence diagram showing an operation of a processor that does not include a pipeline control unit according to a first embodiment.
Figure 20:
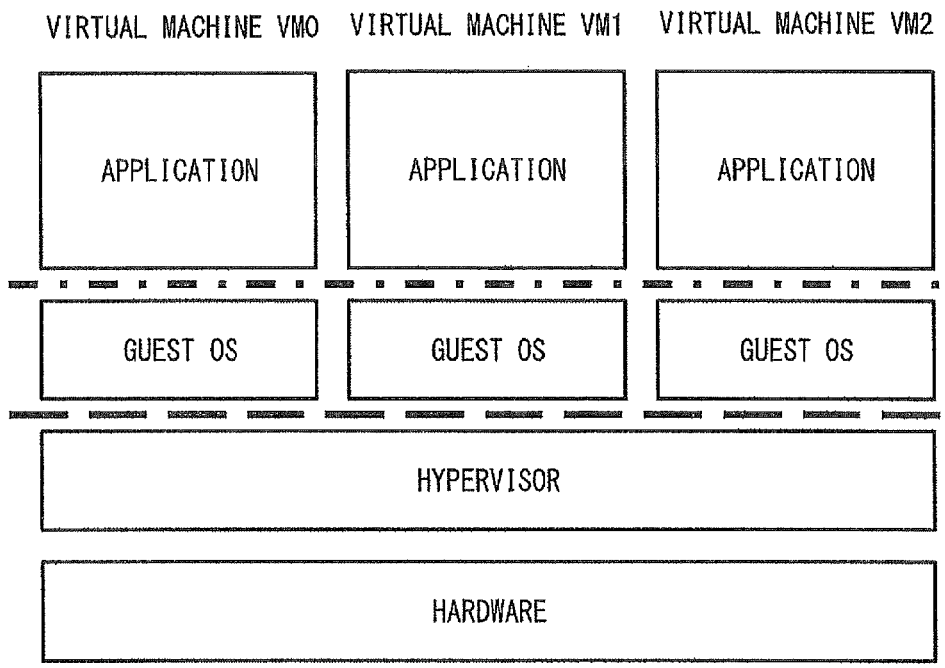
FIG. 20 shows an example of a software layer that is implemented in a semiconductor device to which a virtualization technique is applied.
Figure 21:
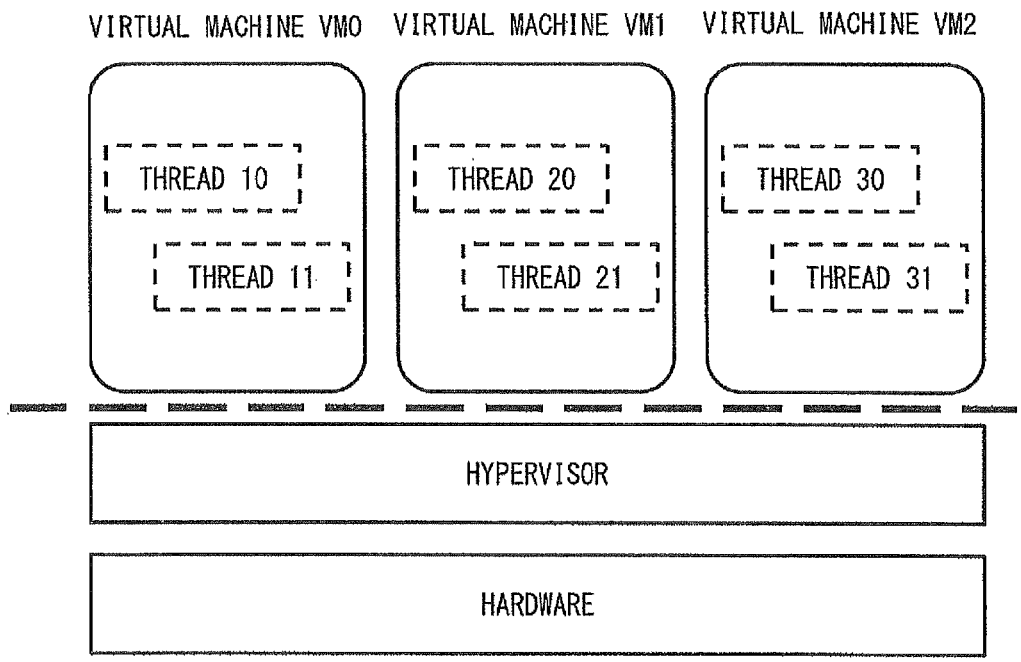
FIG. 21 shows a corresponding relation between threads and virtual machines in a semiconductor device to which a virtualization technique is applied.

Next, an operation of the semiconductor device 1 according to the first embodiment is explained from a different point of view with reference to sequence diagrams (FIGS. 14 to 18). Firstly, FIG. 14 shows a sequence diagram showing an operation of the semiconductor device 1 according to the first embodiment. FIG. 14 shows an example in which a hypervisor program is called based on a normal process in the semiconductor device 1. Note that FIGS. 14 to 17 show sequence diagrams for the semiconductor device 1 in which the execution authorities of virtual machines are defined according to the virtual machine register settings shown in FIG. 4. Further, FIG. 18 shows a sequence diagram showing an operation of a semiconductor device in which a hypervisor program is started by without interposing a hypervisor stub program in any of the virtual machines. That is, FIG. 18 shows a comparative example to the semiconductor device 1 according to the first embodiment.

As shown in the upper part of FIG. 14, in the semiconductor device 1, when a virtual machine VM0 executes an HVCALL instruction, the virtual machine VM0 executes a hypervisor stub program in a virtual machine mode in response to the HVCALL instruction. Then, as the hypervisor stub program executes an HVTRAP instruction, the semiconductor device 1 changes the operating mode to a native mode and executes a hypervisor program. In this process, as shown in FIG. 14, the hypervisor stub program continues to run in the background even when the hypervisor program is in execution. Then, in response to the completion of the process of the hypervisor program, the semiconductor device 1 returns the operating mode to the virtual machine mode and returns the process to the hypervisor stub program. After that, the semiconductor device 1 returns the operating mode to the virtual machine mode that runs the user application by executing a return instruction by the hypervisor stub program.

Further, as shown in the lower part of FIG. 14, in the semiconductor device 1, a virtual machine VM1 is permitted to execute an HVTRAP instruction. Therefore, in the semiconductor device 1, when an HVTRAP instruction is executed in the virtual machine VM1, the semiconductor device 1 changes the operating mode from a virtual machine mode to a native mode and directly executes a hypervisor program in response to that HVTRAP instruction. Then, in response to the completion of the process of the hypervisor program, the semiconductor device 1 returns the operating mode to the virtual machine mode and returns the process to the user program.

Figure 15:
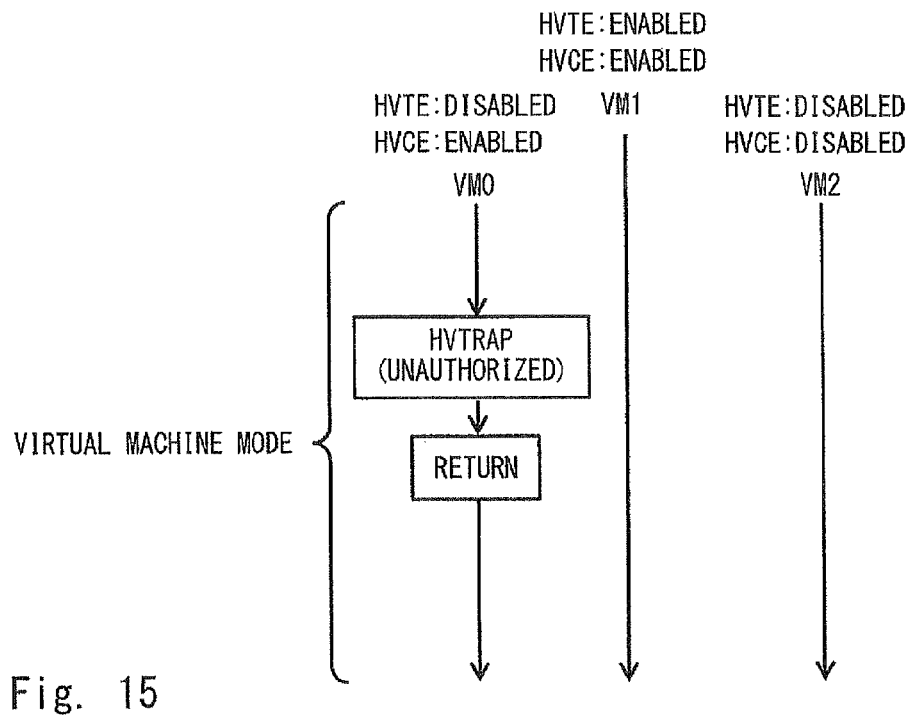
FIG. 15 is a sequence diagram showing an operation that is performed when an unauthorized call for a hypervisor program occurs in a semiconductor device according to a first embodiment.

Next, FIG. 15 is a sequence diagram showing an operation that is performed when an unauthorized call for a hypervisor program occurs in the semiconductor device according to the first embodiment. As shown in FIG. 15, in the semiconductor device 1, the execution authority for an HVTRAP instruction is not given to the virtual machine VM0. Therefore, when an HVTRAP instruction is executed in the virtual machine VM0, in the process relating to that HVTRAP instruction, the HVTRAP execution authority exception signal S5 becomes an enabled state in the virtual machine control circuit 20 of the pipeline control unit 15 during the processing period of a guest OS. Then, in response to the change of the HVTRAP execution authority exception signal S5 to the enabled state, the pipeline control signal generation circuit 22 generates an instruction fetch control signal IFC, an instruction decode control signal IDC, a register control signal RFC, and an execution unit control signal EUC so that the execution unit 16 executes a return instruction. Then, as the return instruction is executed in the virtual machine VM0, the execution authority of the virtual machine VM0 returns to the user mode. In this process, in the semiconductor device 1, since the exception handling is performed during the processing period of the guest OS, which is executed in the virtual machine mode, the operations of other virtual machines are continued regardless of the execution of the HVTRAP instruction in the virtual machine VM0.

Further, even when the HVCALL instruction is executed in the virtual machine VM0, an error process (or exception handling) is performed by the hypervisor stub program when the request from the caller is an unauthorized request in the process of the hypervisor stub program. Therefore, FIG. 16 is a sequence diagram showing an operation of the semiconductor device 1 that is performed when an unauthorized call for a hypervisor stub program occurs. As shown in FIG. 16, in the semiconductor device 1, even when the HVCALL instruction is executed, the operation authority can be returned to the user mode without changing the operating mode to the native mode when the request from the caller is an unauthorized request.

Next, FIG. 17 is a sequence diagram showing an operation of the semiconductor device 1 that is performed when an HVCALL instruction or an HVTRAP instruction is executed in a virtual machine VM2 to which neither the execution authority of the HVCALL instruction nor the execution authority of the HVTRAP instruction is given. Neither the execution authority of the HVCALL instruction nor the execution authority of the HVTRAP instruction is given to the virtual machine VM2. Therefore, in the semiconductor device 1, when an HVTRAP instruction or an HVCALL instruction is executed in the virtual machine VM2, an exception handling is performed during the processing period of a guest OS. More specifically, in the virtual machine VM2, as a result of the execution of an HVTRAP instruction or an HVCALL instruction, the HVCALL execution authority exception signal S4 or the HVTRAP execution authority exception signal S5 becomes an enabled state in the virtual machine control circuit 20 of the pipeline control unit 15. Then, in response to the change of the HVCALL execution authority exception signal S4 or the HVTRAP execution authority exception signal S5 to the enabled state, the pipeline control signal generation circuit 22 generates an instruction fetch control signal IFC, an instruction decode control signal IDC, a register control signal RFC, and an execution unit control signal EUC so that the execution unit 16 executes a return instruction. Then, as the return instruction is executed in the virtual machine VM2, the virtual machine VM2 returns the process to the user application while remaining in the virtual machine mode.

Next, a comparative example shown in FIG. 18 is explained. In the comparative example shown in FIG. 18, the semiconductor device neither manages the execution authority of an HVTRAP instruction nor starts a hypervisor program through a hypervisor stub program. Therefore, in the semiconductor device according to the comparative example, any of the virtual machines VM0 to VM2 can call a hypervisor program by executing an HVTRAP instruction. In the example shown in FIG. 18, the virtual machine VM0 executes an HVTRAP instruction.

Therefore, as shown in FIG. 18, in the semiconductor device according to the comparative example, when the virtual machine VM0 executes an HVTRAP instruction frequently due to some kind of malfunction of the application, it is impossible to prevent the transition to the native mode caused by the HVTRAP instruction. Further, there is a problem that when the transition to the native mode like this occurs frequently, the processing performance of the semiconductor device deteriorates. This is because the processes of other virtual machines are stopped every time the transition occurs.

As can be seen from the above explanation, in the semiconductor device 1 according to the first embodiment, the pipeline control unit 15 includes virtual machine control registers that are used to define the presence/absence of an authority to execute a first privilege program (e.g., hypervisor stub program) that is executed on one virtual machine for each virtual machine. Further, the pipeline control unit 15 refers to the virtual machine control register, and when the virtual machine that has issued an instruction code (e.g., HVCALL instruction) relating to a hypervisor stub program has an authority to execute the hypervisor stub program, instructs the execution unit 16 to execute a process based on an instruction code relating to a second privilege program (e.g., hypervisor program) that runs by using a hardware resource, based on an operation of the hypervisor stub program.

As a result, in the semiconductor device 1 according to the first embodiment, even when a malfunction that causes an application program to call a hypervisor program frequently occurs, it is possible to prevent the hypervisor program from being directly called by the operation of the hypervisor stub program. Further, owing to the operation like this, it is possible to prevent the transition to the native mode from occurring frequently in the semiconductor device 1 according to the first embodiment. Further, in the semiconductor device 1, it is possible to reduce the frequency of occurrences of interference between virtual machines, which is caused when a transition to the native mode occurs frequently, and thereby to prevent the deterioration of the processing performance due to the software malfunction.

Further, in the semiconductor device 1 according to the first embodiment, it is possible to execute a hypervisor stub program having a hypervisor privilege within a virtual machine. Therefore, when an operation that completes within a virtual machine executing this hypervisor stub program and requires a hypervisor privilege occurs, the process that requires the hypervisor privilege can be completed without stopping other virtual machines. As a result, the semiconductor device 1 according to the first embodiment can reduce the frequency at which the operations of virtual machines are stopped and thereby to improve the overall performance of the semiconductor device.

Further, in the semiconductor device 1 according to the first embodiment, the execution authority of an HVTRAP instruction for calling a hypervisor program and the execution authority of an HVCALL instruction for calling a hypervisor stub program are set for each virtual machine. Therefore, it is possible to prevent a virtual machine that executes an application program having low reliability from calling a hypervisor stub program and a hypervisor program. Further, it is possible to give the execution authority of an HVTRAP instruction only to a virtual machine (s) that executes an application program having high reliability. By setting the execution authorities of an HVCALL instruction and an HVTRAP instruction for each virtual machine as described above, it is possible to improve the reliability for an application program(s) having low reliability and to reduce the overhead that is caused when a hypervisor program is called for an application program(s) having high reliability.

Further, in the semiconductor device 1, the rewriting of the HVCALL permission flag HVCE, the HVTRAP permission flag HVTE, the HV privilege flag HVP, and the virtual machine enable flag EN of the virtual machine control register is permitted only to a program (s) that runs in a hypervisor privilege level. As a result, it is possible to prevent the setting values of these flags from being corrupted by a program running in an operating mode having low reliability such as the user mode.

Second Embodiment

As a second embodiment, an embodiment in which an operation in a hypervisor privilege level is permitted even to a program having an execution authority level whose reliability is lower than that of the hypervisor privilege level is explained. Therefore, FIG. 19 shows an example of virtual machine control registers of a semiconductor device according to a second embodiment of the present invention.

In the example shown in FIG. 19, the HV privilege flag of a virtual machine control register corresponding to a virtual machine VM1 is set to 1 (e.g., enabled state). When this HV privilege flag is 1, the output of the OR circuit 32 of the virtual machine control circuit 20 shown in FIG. 3 becomes 1 at all times. Therefore, the execution authorities of an HVTRAP instruction and an HVCALL instruction are give to the virtual machine VM1 regardless of whether the HVTRAP permission flag HVTE and the HVCALL permission flag HVCE are enabled or disabled.

Further, when this HV privilege flag HVP is in an enabled state, the semiconductor device according to the second embodiment refers to the HV privilege flag HVP and thereby permits access to a resource that is permitted only to a program (s) having a hypervisor privilege level to, for example, a guest OS operating in a supervisor privilege level. Note that in the semiconductor device according to the second embodiment, the pipeline control signal generation circuit 22 refers to the HV privilege flag HVP, so that when access to the resource in a hypervisor privilege level occurs in the guest OS, the process is continued without performing an exception handling.

By giving a hypervisor privilege to a guest OS as described above, a resource that can be operated only by a program (s) having a hypervisor privilege level can be accessed without executing an HVTRAP instruction or an HVCALL instruction in the semiconductor device according to the second embodiment. Further, by giving a hypervisor privilege level to a program having a supervisor privilege level as described above, it is possible to eliminate the switching between software programs and thereby to improve the processing performance of the semiconductor device.

The invention made by the inventor has been explained above based on embodiments. However, the present invention is not limited to the above-described embodiments and, needless to say, various modifications can be made to them without departing from the scope and sprit of the present invention. For example, what kind of procedure should be used to select the thread to be executed in the thread scheduler 21 is a technical matter that can be chosen as desired according to the specifications of the semiconductor device 1. Further, although examples in which the execution unit 16 is a single core CPU are explained in the above-shown embodiments, the technique disclosed in the present invention can be also applied to a multi-core CPU including a plurality of arithmetic circuits including an execution unit.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device that performs processing while switching an operating mode between a virtual machine mode in which a program is performed in parallel by a plurality of virtual machines and a native mode in which a program is performed by exclusively using an execution time of an execution unit,
wherein the semiconductor device executes in the virtual machine mode:
a user program including a user privilege level for which access to a specific hardware resource is limited among hardware resources within the semiconductor device;
a supervisor program that manages the user program;
a hypervisor program which includes a hypervisor privilege level and is configured to access to all hardware resources; and
a hypervisor stub program including the hypervisor privilege level which runs in response to a call from the supervisor program and for which access to the hardware resources including the specific hardware resource is permitted,
wherein presence/absence of an authority to execute a first instruction code for calling the hypervisor stub program is defined for the supervisor program,
wherein the hypervisor stub program starts in response to a call from the supervisor program for which execution of the first instruction code is permitted, determines whether or not the first instruction code can be processed without stopping other virtual machines, calls the hypervisor program by executing a second instruction code when the first instruction code can be processed without stopping the other virtual machines, and changes the operating mode to the native-mode, and
wherein the hypervisor program writes information about the presence/absence of an authority to execute a first instruction code in a register.

2. The semiconductor device according to claim 1, wherein, when the supervisor program for which execution of the first instruction code is not permitted executes the first instruction code, the supervisor program performs an exception handling within an own program without calling the hypervisor stub program.

3. The semiconductor device according to claim 1, wherein presence/absence of an authority to execute the second instruction code is set in the supervisor program, and
wherein the hypervisor program starts in response to a call from the supervisor program for which execution of the second instruction code is permitted.

4. The semiconductor device according to claim 3, wherein, when the supervisor program for which execution of the second instruction code is not permitted executes the second instruction code, the supervisor program performs an exception handling within an own program without calling the hypervisor program.

5. The semiconductor device according to claim 1, wherein the register is configured such that only the hypervisor program writes values of a virtual machine control register.

6. The semiconductor device according to claim 1, wherein the register is configured such that the hypervisor program writes values of a virtual machine control register.

7. The semiconductor device according to Claim 1, wherein, when the first instruction code includes a setting change that affects only one of the virtual machines that has issued instructions on the access to the hardware resources, the first instruction code is completed without said stopping the other virtual machines.

8. The semiconductor device according to claim 1, wherein, when it is determined that the first instruction code can be processed without said stopping the other virtual machines, the semiconductor device provides a service by the hypervisor stub program within the virtual machine mode.

9. The semiconductor device according to claim 8, wherein, after providing the service, the semiconductor device sets a return value, issues a return instruction, and instructs to return to a user application.

10. The semiconductor device according to claim 1, wherein, when it is determined that the first instruction code cannot be processed without said stopping the other virtual machines, it is determined whether the semiconductor device can be changed to a native mode.

11. The semiconductor device according to claim 10, wherein, when it is determined that the semiconductor device can be changed to the native mode, the hypervisor stub program issues instructions for the access to the hardware resources.

12. The semiconductor device according to claim 1, wherein, when a process performed in the other virtual machines relates to a task that requires a real-time capability, the process continues without said stopping the other virtual machines.

* * * * *